US012777093B2

(12) United States Patent
Xu et al.

(10) Patent No.: US 12,777,093 B2
(45) Date of Patent: Oct. 27, 2026

(54) METHOD FOR OPTIMIZING DATA ACCESS PERFORMANCE AND INTERMEDIATE DEVICE

(71) Applicant: HUAWEI TECHNOLOGIES CO., LTD., Shenzhen (CN)

(72) Inventors: Yan Xu, Nanjing (CN); Wanhong Meng, Shenzhen (CN); Haiyan Chen, Wuhan (CN); Kai Du, Beijing (CN); Jun Huang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/411,645

(22) Filed: Jan. 12, 2024

(65) Prior Publication Data

US 2024/0155029 A1 May 9, 2024

Related U.S. Application Data

(63) Continuation of application No. PCT/CN2022/104446, filed on Jul. 7, 2022.

(30) Foreign Application Priority Data

Jul. 15, 2021 (CN) ......................... 202110799865.9

(51) Int. Cl.
*H04L 67/1097* (2022.01)

(52) U.S. Cl.
CPC ................................ *H04L 67/1097* (2013.01)

(58) Field of Classification Search
CPC ..... H04L 67/1097; H04L 69/14; G06F 13/14; G06F 13/28; G06F 3/0656
See application file for complete search history.

(56) References Cited

U.S. PATENT DOCUMENTS 7,756,130 B1 * 7/2010 Lee ......................... H04L 67/34 370/389
10,282,301 B2 * 5/2019 Simionescu .......... G06F 3/0689
11,983,441 B2 * 5/2024 Subramanian .......... G06F 3/067
(Continued)

FOREIGN PATENT DOCUMENTS

CN 104283913 A 1/2015
CN 110011973 A 7/2019
(Continued)

*Primary Examiner* — Chirag R Patel
(74) *Attorney, Agent, or Firm* — WOMBLE BOND DICKINSON (US) LLP

(57) ABSTRACT

A method for optimizing data access performance, which is applied to an intermediate device, is described. The intermediate device is a network device between a client and a server side, there are one or more clients and one or more server sides. The method includes the intermediate device parsing a received first packet to obtain a feature of the first packet, where the first packet is from a terminal on which one of the clients is located, the first packet is used to request data from one of the server sides, the feature indicates the data requested by using the first packet, and the feature is carried in a part that is of the first packet and that corresponds to application layer data. The method may also include, when the intermediate device stores the data requested by using the first packet, sending the data requested by using the first packet to the terminal.

18 Claims, 15 Drawing Sheets

(56) References Cited

U.S. PATENT DOCUMENTS

2014/0181249 A1* 6/2014 Saeki .................. H04L 67/1097
709/217
2015/0127882 A1* 5/2015 Carlson .................. G06F 13/10
711/103
2017/0097908 A1* 4/2017 Simionescu ............ G06F 13/28
2018/0052779 A1* 2/2018 McCauley .......... G06F 12/0862
2019/0222649 A1 7/2019 Cheng et al.
2020/0301861 A1* 9/2020 Yu ....................... G06F 9/30038

FOREIGN PATENT DOCUMENTS

CN 111953742 A 11/2020
EP 2903233 A1 8/2015

* cited by examiner (a)

(b)

METHOD FOR OPTIMIZING DATA ACCESS PERFORMANCE AND INTERMEDIATE DEVICE

CROSS-REFERENCE TO RELATED APPLICATIONS

This application is a continuation of International Application No. PCT/CN2022/104446, filed on Jul. 7, 2022, which claims priority to Chinese Patent Application No. 202110799865.9, filed on Jul. 15, 2021. The disclosures of the aforementioned applications are hereby incorporated by reference in their entireties.

TECHNICAL FIELD

This application relates to the field of data access technologies, and more specifically, to a method for optimizing data access performance and an intermediate device.

BACKGROUND

The modern internet needs to process a large amount of data. Therefore, a performance requirement on a server side, for example, a database (DB) or a storage device, is increasingly high. The database or the storage device is generally deployed in a cluster manner.

For example, after the storage device receives a packet from a client, if data requested by using the packet is in another storage device, the current storage device needs to obtain the data requested by using the packet from the another storage device, to increase network overheads of the storage device. Similarly, when data that is requested by using a packet and that is received by a database node in a database cluster is in another database node, the database node needs to redirect the packet, to forward the packet to the another database node. This also increases network overheads of the database node.

SUMMARY

This application provides a method for optimizing data access performance and an intermediate device. The technical solution can reduce network overheads of a server side, to improve overall data access performance.

According to a first aspect, a method for optimizing data access performance is provided. The method is applied to an intermediate device in a communication network, the intermediate device is a network device between a client and a server side, there are one or more clients, there are one or more server sides, and the method includes: The intermediate device parses a received first packet to obtain a feature of the first packet, where the first packet is from a terminal on which one of the clients is located, the first packet is used to request data from one of the server sides, the feature indicates the data requested by using the first packet, and the feature is carried in a part that is of the first packet and that corresponds to application layer data; and when the intermediate device stores the data requested by using the first packet, the intermediate device sends the data requested by using the first packet to the terminal.

The client may be located in the terminal device, the server side may be a storage device, a storage device cluster, a database, a database cluster, or the like, and the intermediate device may be a programmable network device, a programming protocol-independent packet processors (P4) switch, a network processor, a field programmable gate array, or the like.

It should be understood that the intermediate device, the client, and the server side may be located in a same trusted area, for example, may be located in a same trusted communication network. In this case, the data in the first packet may not need to be encrypted. Therefore, the intermediate device may directly extract the part corresponding to the application layer data in the first packet.

In this way, the intermediate device located between the server side and the client may parse the received first packet to obtain the feature corresponding to an application layer in the packet, where the feature indicates the data requested by using the first packet. In other words, the intermediate device may learn of, by parsing the first packet, information about to-be-requested data indicated by the first packet. In another aspect, the intermediate device itself stores a part of data. In this way, the intermediate device may perform query at a local end, and when the intermediate device stores the data requested by using the first packet, the intermediate device may send the data requested by using the first packet to the terminal. In this technical solution, the data is avoided to be obtained from a remote server side, so that network overheads of the server side are reduced and overall data access performance is improved.

With reference to the first aspect, in some embodiments of the first aspect, the feature of the first packet includes values of a plurality of fields arranged according to a rule, and the rule indicates a corresponding order of the plurality of fields in the feature of the first packet.

In some other embodiments, the feature of the first packet may also include a value of a single field.

With reference to the first aspect, in some embodiments of the first aspect, the plurality of fields include a scatter-gather list SGL field and a start logical block address (start LBA) field.

With reference to the first aspect, in some embodiments of the first aspect, there are one or more server sides, the intermediate device stores a mapping relationship between the feature of the first packet and a server side identifier, and the method further includes: when the intermediate device does not store the data requested by using the first packet, the intermediate device sends, in a redirection manner based on the feature of the first packet and the mapping relationship between the feature of the first packet and the server side identifier, a second packet to a server side corresponding to the feature of the first packet, where data requested by using the second packet is the same as that requested by using the first packet.

The server side identifier may be an address, an identity ID, or the like. The address may be a network address, for example, an IP address or a media access control address. The ID may also be a tag ID in a case in which a tag technology is used.

In this embodiment of this application, the redirection means that the intermediate device may modify a packet header of the first packet to obtain the second packet, and the second packet may be used to access a corresponding server side based on the packet header. The data requested by using the second packet is the same as that requested by using the first packet.

With reference to the first aspect, in some embodiments of the first aspect, the first packet is specifically used to request data from a storage device, and the data specifically requested by using the first packet is block data of the storage device.

For example, the first packet carries an address of the block data and a length of the block data.

With reference to the first aspect, in some embodiments of the first aspect, the first packet is specifically used to request data from a database, and the data specifically requested by using the first packet is a record in the database.

For example, the data requested by using the first packet is a record in the database.

With reference to the first aspect, in some embodiments of the first aspect, the method further includes: The intermediate device receives a third packet, where the third packet is used to request data from one of the server sides, and the third packet is from a terminal on which one of the clients is located; and when a quantity of requested times of the data requested by using the third packet is greater than a threshold, the intermediate device stores the data requested by using the third packet in the intermediate device.

The third packet and the first packet may be from a same terminal, or may be from different terminals.

It should be understood that when the quantity of requested times of the data requested by using the third packet is greater than the threshold, it indicates that the data requested by using the third packet is frequently requested by the terminal or another terminal. In other words, the data may be understood as hot data, and the intermediate device may cache the data in the intermediate device, so that the intermediate device may directly send the data to the terminal with no need to request the data from a remote server side, thereby improving data access efficiency.

With reference to the first aspect, in some embodiments of the first aspect, the data that is requested by using the third packet and that is stored in the intermediate device is requested by the intermediate device from a storage device; or the data that is requested by using the third packet and that is stored in the intermediate device is obtained by the intermediate device from a packet sent by a storage device to a client.

It should be understood that the intermediate device may actively request, from the storage device, the data requested by using the third packet, or may obtain, from a response packet sent by the storage device to the terminal, the data requested by using the third packet, and store the data.

In this example, when the quantity of requested times of the data requested by using the third packet is greater than the threshold, the intermediate device may send a request message to the storage device to request the data requested by using the third packet, and store the data.

Alternatively, when the quantity of requested times of the data requested by using the third packet is greater than the threshold, the intermediate device may intercept the packet sent by the storage device to the client to obtain the data requested by using the third packet, and store the data.

The packet sent by the storage device to the client is sent in response to a request packet of the client, that is, the packet is a response packet returned by the storage device to the client after the storage device receives the request packet of the client.

With reference to the first aspect, in some embodiments of the first aspect, the intermediate device stores the data requested by using the first packet in a cache.

Based on an embodiment of this application, the intermediate device stores the data requested by using the first packet in the cache. When another packet also requests the data, the intermediate device may directly send the data to the terminal, thereby improving data access efficiency.

With reference to the first aspect, in some embodiments of the first aspect, an application layer field included in the feature of the first packet is a key-value string.

According to a second aspect, an intermediate device in a communication network is provided. The intermediate device is a network device between a client and a server side, there are one or more clients, there are one or more server sides, and the intermediate device includes: a processing unit, configured to parse a received first packet to obtain a feature of the first packet, where the first packet is from a terminal on which one of the clients is located, the first packet is used to request data from one of the server sides, the feature indicates the data requested by using the first packet, and the feature is carried in a part that is of the first packet and that corresponds to application layer data; and a transceiver unit, configured to: when the intermediate device stores the data requested by using the first packet, send the data requested by using the first packet to the terminal.

With reference to the second aspect, in some embodiments of the second aspect, the feature of the first packet includes values of a plurality of fields arranged according to a rule, and the rule indicates a corresponding order of the plurality of fields in the feature of the first packet.

With reference to the second aspect, in some embodiments of the second aspect, the plurality of fields include a scatter-gather list SGL field and a start LBA field.

With reference to the second aspect, in some embodiments of the second aspect, there are one or more server sides, the intermediate device stores a mapping relationship between the feature of the first packet and a server side identifier, and the transceiver unit is further configured to: when the intermediate device does not store the data requested by using the first packet, send, by the intermediate device in a redirection manner based on the feature of the first packet and the mapping relationship between the feature of the first packet and the server side identifier, a second packet to a server side corresponding to the feature of the first packet, where data requested by using the second packet is the same as that requested by using the first packet.

With reference to the second aspect, in some embodiments of the second aspect, the first packet is specifically used to request data from a storage device, and the data specifically requested by using the first packet is block data of the storage device.

With reference to the second aspect, in some embodiments of the second aspect, the first packet is specifically used to request data from a database, and the data specifically requested by using the first packet is a record in the database.

With reference to the second aspect, in some embodiments of the second aspect, the transceiver unit is further configured to: receive a third packet, where the third packet is used to request data from one of the server sides, and the third packet is from a terminal on which one of the clients is located; and the processing unit is further configured to: when a quantity of requested times of the data requested by using the third packet is greater than a threshold, store the data requested by using the third packet in the intermediate device.

With reference to the second aspect, in some embodiments of the second aspect, the data that is requested by using the third packet and that is stored in the intermediate device is requested by the intermediate device from a storage device; or the data that is requested by using the third packet and that is stored in the intermediate device is obtained by the intermediate device from a packet sent by a storage device to a client.

With reference to the second aspect, in some embodiments of the second aspect, the intermediate device stores the data requested by using the first packet in a cache.

With reference to the second aspect, in some embodiments of the second aspect, an application layer field included in the feature of the first packet is a key-value string.

According to a third aspect, an intermediate device in a communication network is provided, including one or more processors and one or more memories. The one or more memories store one or more computer programs, the one or more computer programs include instructions, and when the instructions are executed by the one or more processors, the method for optimizing data access performance according to any one of the first aspect and the possible embodiments of the first aspect is performed.

According to a fourth aspect, a chip is provided. The chip includes a processor and a communication interface, the communication interface is configured to receive a signal and transmit the signal to the processor, and the processor processes the signal, so that the method for optimizing data access performance according to any one of the first aspect and the possible embodiments of the first aspect is performed.

According to a fifth aspect, a computer-readable storage medium is provided. The computer-readable storage medium stores computer instructions, and when the computer instructions are run on a computer, the method for optimizing data access performance according to any one of the first aspect and the possible embodiments of the first aspect is performed.

According to a sixth aspect, a computer program product is provided, including computer instructions. When the computer instructions are run on an intermediate device, the method for optimizing data access performance according to any one of the first aspect and the possible embodiments of the first aspect is performed.

DESCRIPTION OF EMBODIMENTS

The following describes technical solutions of this application with reference to accompanying drawings.

A network device in embodiments described in this application may be a device configured to communicate with a terminal device. For example, the network device may be a network switch or a router or may be a radio controller in a cloud radio access network (CRAN) scenario, or the network device may be a relay station, an access point, a vehicle-mounted device, a wearable device, a network device in a fifth-generation (5G) network, a network device in a future evolved public land mobile network (PLMN) network, or the like. This is not limited in this embodiment of this application.

Figure 1:
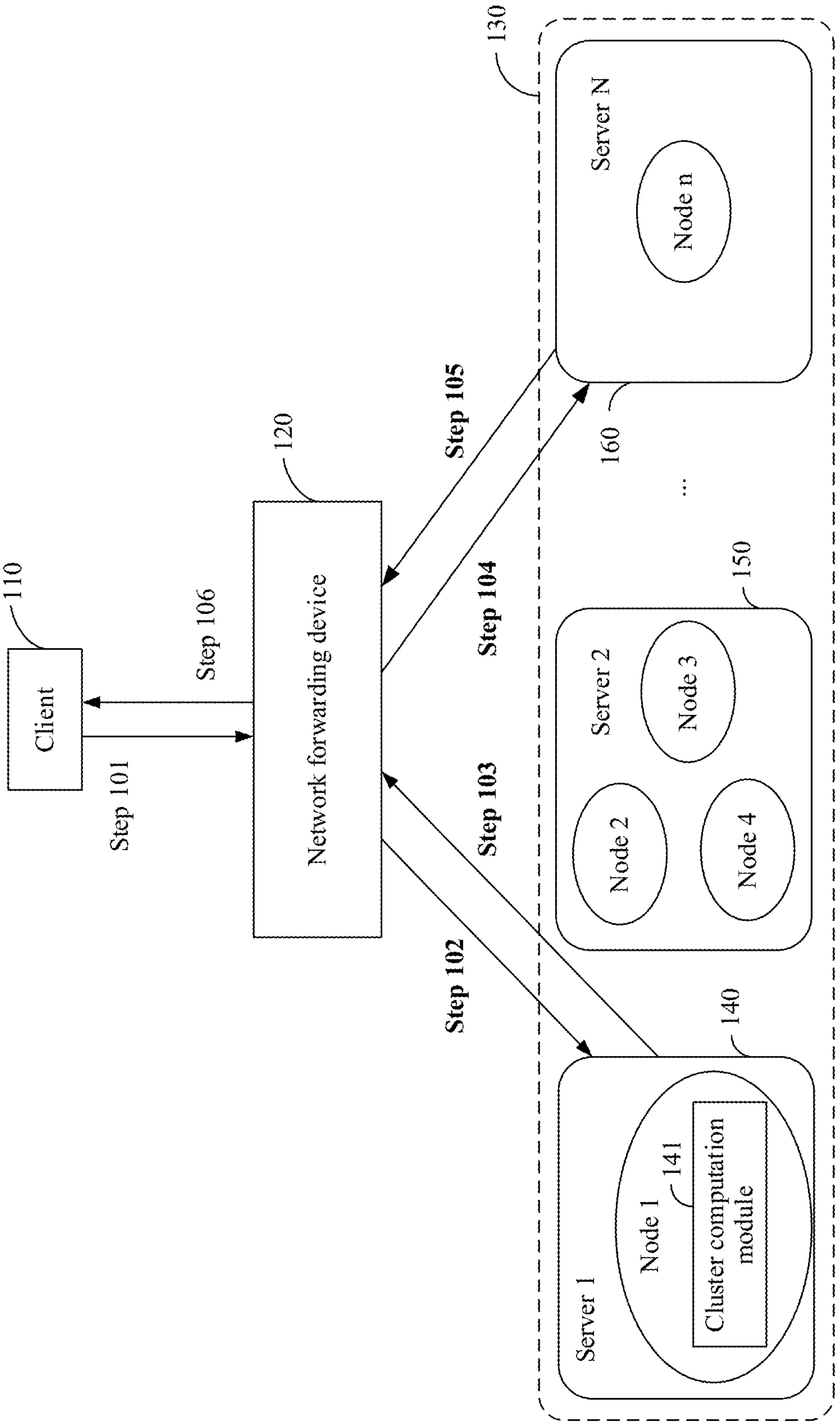
FIG. 1 is a schematic diagram of accessing a database by a client according to an embodiment of this application.

FIG. 1 is a schematic diagram of accessing a database by a client according to an embodiment of this application.

Refer to FIG. 1. The database is generally deployed in a cluster manner. Cluster nodes may be distributed in a plurality of host servers in a form of a virtual machine or a container, or may directly run in a server host, and nodes distributed on different servers are virtualized into an entire service through an Ethernet.

For example, a server 2 in FIG. 1 includes a database node 1, a database node 2, and a database node 3, that is, the server 2 includes a plurality of DBs.

Specifically, as shown in FIG. 1, a process in which a client 110 accesses the database may include operation 101 to operation 105.

It should be understood that the client 110 may also be referred to as a user, and there may be one or more clients.

Operation 101: The client 110 sends a packet to a cluster 130 to access some data, and the like, where the packet first passes through a network forwarding device 120.

It should be understood that, when the client requests data from the cluster 130, a packet of the requested data is forwarded to the cluster 130 by using the network forwarding device 120.

Operation 102: The network forwarding device 120 forwards the packet to a database node 1 in a server 1.

It should be understood that, in operation 102, data actually accessed by the packet may not be in the database node 1. In this case, a cluster computation module in the database node 1 may compute, according to a clustering algorithm, a location of a database node in which the data actually accessed by the packet is located, and then redirect the packet, for example, modify quintuple information of the packet.

It should be further understood that, in operation 102, the network forwarding device 120 randomly sends the packet to the database node 1 in the server 1. In another embodiment, the network forwarding device 120 may also send the packet to the database node 2 in the server 2.

Operation 103: The database node 1 sends the redirected packet to the network forwarding device 120.

Operation 104: The network forwarding device 120 sends the redirected packet to a target database node n.

In operation 104, the target database node of the redirected packet is a database node n in a server N.

Operation 105: The database node n encapsulates the data accessed by the packet, modifies the packet to obtain a reply packet, and sends the reply packet to the network forwarding device 120.

Operation 106: The network forwarding device 120 sends the reply packet to the client.

It can be learned that, when the client accesses a node, if data accessed by the client is on another cluster node, a current node computes, according to a cluster algorithm, a location of a database node in which the data is located, and then initiates a redirection packet to redirect, over a network, to a target database node in which the data is actually located to obtain the data, and the target database node feeds back the data to the client. In this process, the server may need to perform a redirection operation. Traffic used during redirecting is redundant traffic in the entire network, and additionally occupies network input/output of the network forwarding device and the server.

Figure 2:
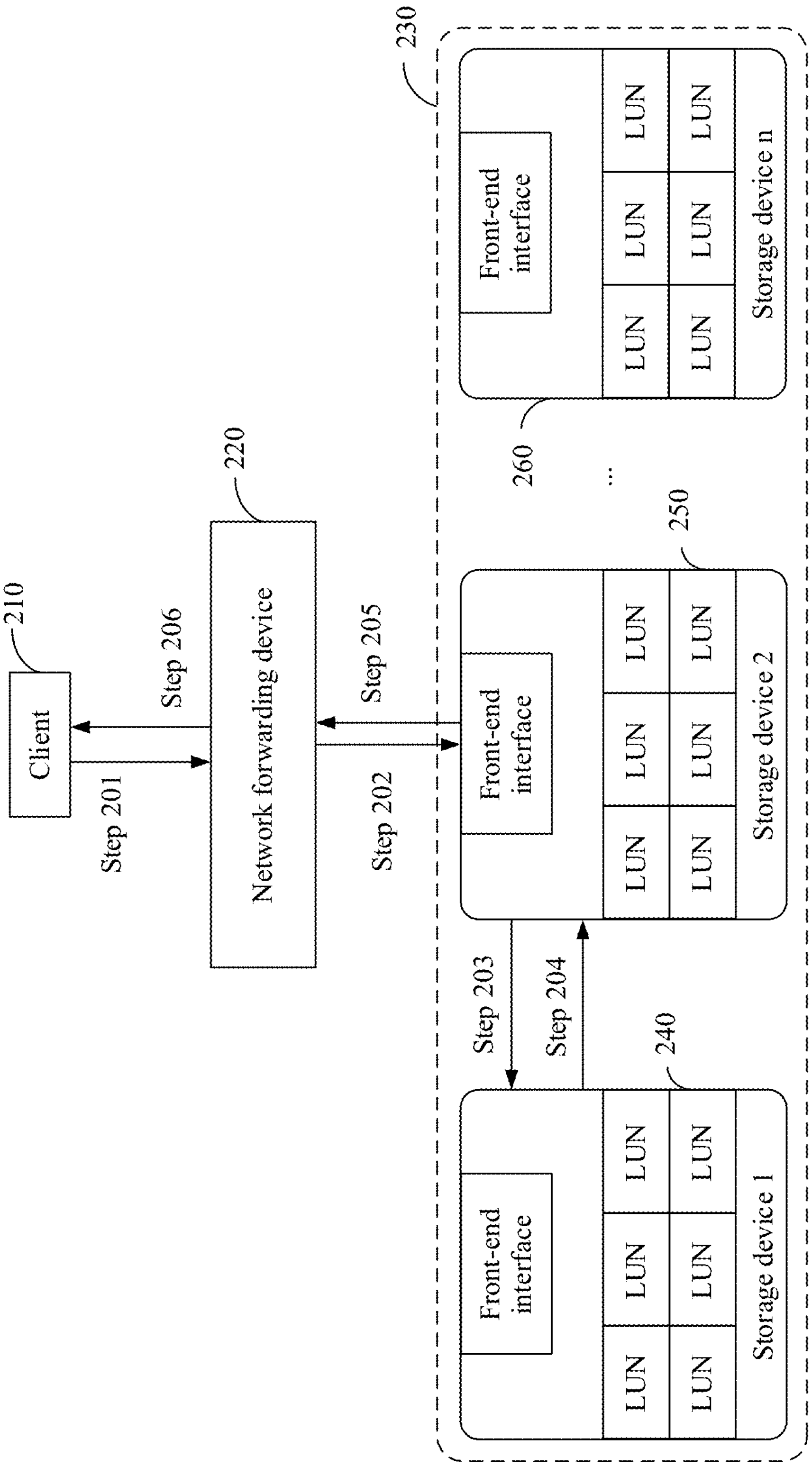
FIG. 2 is a schematic diagram of accessing a storage device by a client according to an embodiment of this application.

FIG. 2 is a schematic diagram of accessing a storage device by a client according to an embodiment of this application.

A storage area network (SAN) is a high-speed network dedicated for a storage operation. The SAN connects a host and a storage device and provides a dedicated communication channel for any host and any storage device on the SAN. The SAN separates the storage device from the server, which implements storage resource sharing at a server layer.

An internet protocol SAN (IP SAN) is used to carry the SAN over an IP network. A storage protocol is carried on a layer 4 or above of the IP network.

Refer to FIG. 2. The storage device may include a controller and a physical storage medium, and the controller and the physical storage medium may be connected through a bus. The controller can abstract a plurality of logical unit numbers (LUN) mapped to the physical storage medium. An IP SAN packet may be received through a front-end interface of the storage device. The controller parses a storage protocol carried in the IP SAN packet to obtain an operation of a target LUN corresponding to the packet, and sends the operation to a physical storage medium corresponding to the target LUN through a bus. The client can use the IP SAN packet to operate a physical storage media of a remote storage device over an IP network.

The storage device may be deployed in a cluster manner. Therefore, data requested by using the packet received through the front-end interface of the storage device may not be data included in the storage device. In this case, the storage device needs to pull the data requested by using the packet into the storage device, and form a reply packet.

For example, the storage device may send a synchronization packet of a data synchronization request to another storage device in which the data requested by using the packet actually exists. The another storage device sends the data requested by using the packet to the storage device, and the storage device encapsulates the data requested by using the packet to form a reply packet. The synchronization packet may be sent or received over an external network or through internal connection.

As shown in FIG. 2, a process in which a client 210 or a client accesses the storage device may include operation 201 to operation 206.

201: The client 210 sends a packet for performing a storage service to a storage device cluster 230, where the packet first passes through a network forwarding device 220.

It should be understood that, when the client sends the packet for performing the storage service to the storage device cluster 230, the packet is forwarded to the storage device cluster 230 by using the network forwarding device 220.

The client 210 may also be referred to as a user, and there may be one or more clients.

202: The network forwarding device 220 accesses data in the storage device through a front-end interface of a storage device 2.

203: If data requested by using the packet of the client is not in the storage device 2 but in a storage device 1, the storage device 2 sends a synchronization packet for data synchronization to the storage device 1.

204: The storage device 1 sends the data requested by using the packet to the storage device 2.

205: The storage device 2 encapsulates the data requested by using the packet to form a reply packet, and sends the reply packet to the network forwarding device 220 through the front-end interface.

206: The network forwarding device forwards the reply packet to the client 210.

It can be learned from the foregoing operations that when the client accesses the storage service, if the finally accessed data is not in the current storage device, the storage device needs to migrate the data from the another storage device, and then perform packet response. This process additionally occupies performance of the storage device.

To improve performance of accessing the database by the data or the storage device, one solution is to use a data plane development kit (DPDK), another solution is to use an intelligent network interface card, and still another solution is to use a hot data cache. The following describes the foregoing technical solutions with reference to FIG. 3 and FIG. 4.

Figure 3:
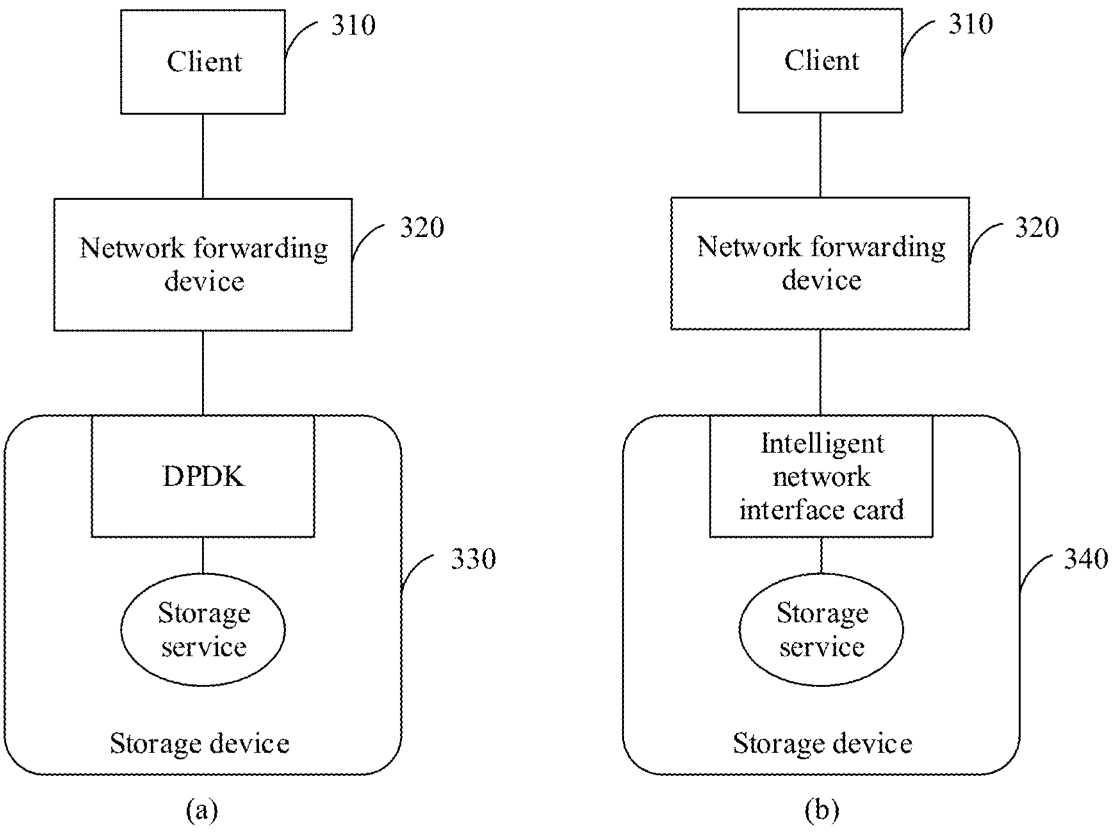
FIG. 3 is a schematic diagram of a solution for optimizing database performance according to an embodiment of this application.

FIG. 3 is a schematic diagram of a solution for optimizing database performance according to an embodiment of this application.

The storage device may include a dedicated device used for a storage service, or a general-purpose server that runs storage service software.

Refer to FIG. 3(*a*). The technical solution uses the DPDK to improve data processing performance and a throughput of data access. A client 310 sends a packet to a network forwarding device 320 to access some data, and the network forwarding device 320 sends the packet to a storage device 330. The storage device 330 uses the DPDK technology to reduce mechanisms such as context switching and improve network performance. However, there are problems such as large network traffic jitter and uneven distribution of traffic to central processing unit (CPU) cores.

Refer to FIG. 3(*b*). The technical solution uses the intelligent network interface card to improve performance of the storage device. A client 310 sends a packet to a network forwarding device 320 to access some data, and the network forwarding device 320 sends the packet to a storage device 340. In this technical solution, the intelligent network interface card is installed in the storage device 340 to replace a conventional network interface card, so that network performance of the storage device is improved. However, a plurality of intelligent network interface cards usually need to be installed, which causes problems such as high costs, high power consumption, and incompatible chassis sizes.

Figure 4:
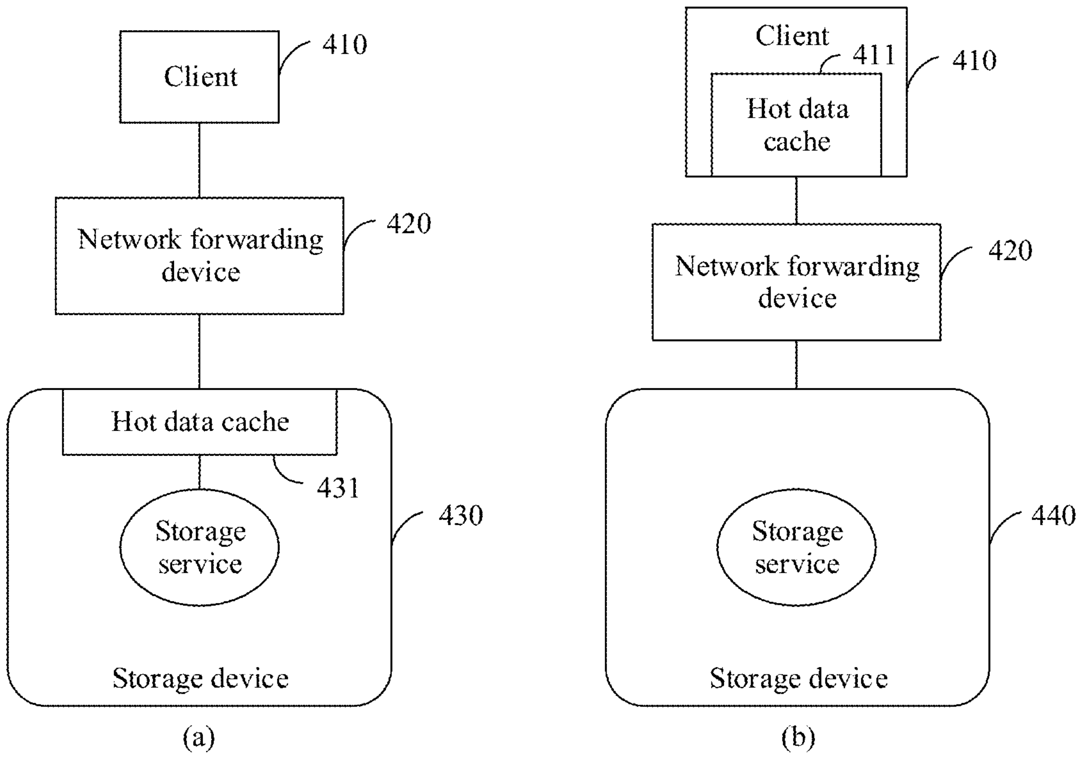
FIG. 4 is a schematic diagram of another solution for optimizing database performance according to an embodiment of this application.

FIG. 4 is a schematic diagram of another solution for optimizing database performance according to an embodiment of this application.

The storage device may include a dedicated device used for a storage service, or a general-purpose server that runs storage service software.

Refer to FIG. 4(*a*). The technical solution uses the hot data caching technology to improve a speed and efficiency of accessing the storage device or a database by a user, thereby improving performance of the storage device or the database. A client 410 sends a packet to a storage device 430 to access some data. The packet first passes through a network forwarding device 420. The network forwarding device 420 sends the packet to a server 430. A part of an area in the server 430 is deployed as a hot data cache 431. The hot data cache stores hot data frequently accessed by the client. When accessing the hot data, the client 410 may directly access the hot data cache 431, so that a speed of accessing the storage device or the database by the client 410 can be improved, and real-time performance of the hot data is high. However, the server needs to deploy an agent or use another technology to process the hotspot data. Operations such as hot data statistics and hot data display still cause extra overheads to the server.

Refer to FIG. 4(*b*). A hot data cache 411 is deployed in a user client 410, and the client may access the hot data cache 411 nearby, and therefore a speed is high, and there is no network bandwidth limitation.

However, the client needs to learn of in advance which data is hot data, and the hot data is also synchronized by the server to the client through the Ethernet. Inconsistency time of the hot data is long. If the hot data changes rapidly, the hot data of the user client is always synchronized.

Figure 5:
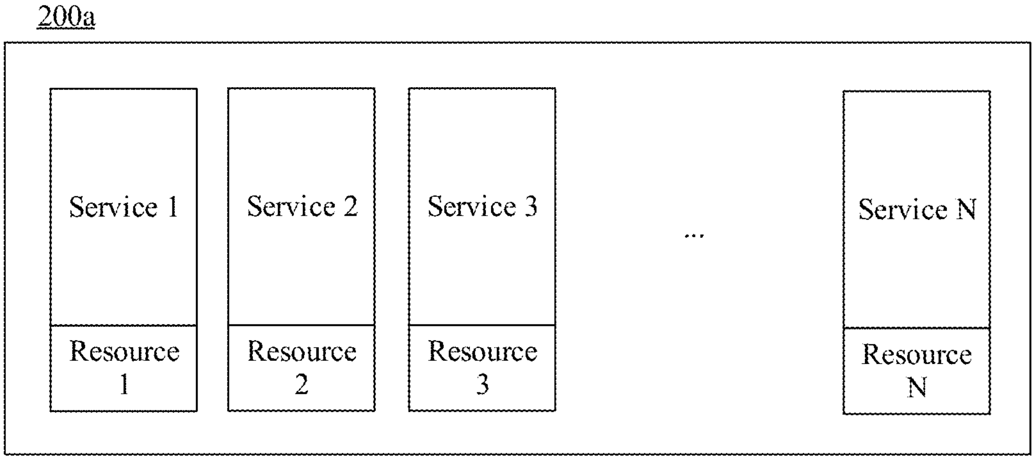
FIG. 5 is a schematic diagram of a network forwarding device according to an embodiment of this application.
Figure 5:
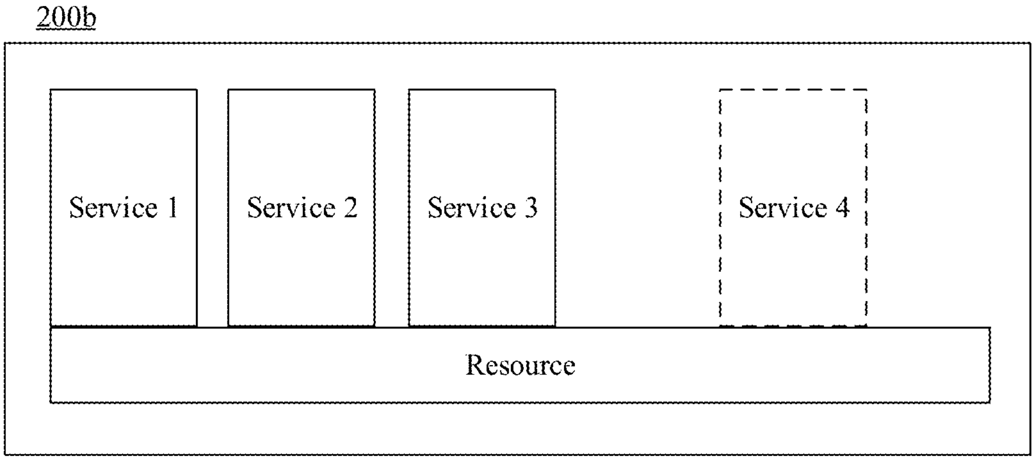

FIG. 5 is a schematic diagram of an intermediate device according to an embodiment of this application.

Refer to FIG. 5(*a*). An intermediate device 200*a* may be the network forwarding device in FIG. 1. The network forwarding device may be, for example, a black-box device such as a switch or a router. A feature of the network forwarding device is that a service function has been fixed, and resource space inside the device has been occupied by various services. For example, resources inside the device may be divided into a resource 1 to a resource N, and each resource is occupied by a corresponding service. Therefore, a process of implementing a new function requirement by a conventional network forwarding device is complex and cumbersome.

Refer to FIG. 5(*b*), a service of a programmable network device 200*b* is not fixed, and the service may be flexibly created and loaded according to a requirement of the programmable network device 200*b*. A new service such as a service 4 may be quickly developed and brought online, and a space resource occupied by the service 4 may be flexibly defined. Therefore, the programmable network device can flexibly implement a required function.

In view of this, this application provides a method for optimizing data access performance and an intermediate device in a communication network. The method can improve performance of a storage device or a database, so that efficiency of accessing the storage device or the database by a client is improved.

Figure 6:
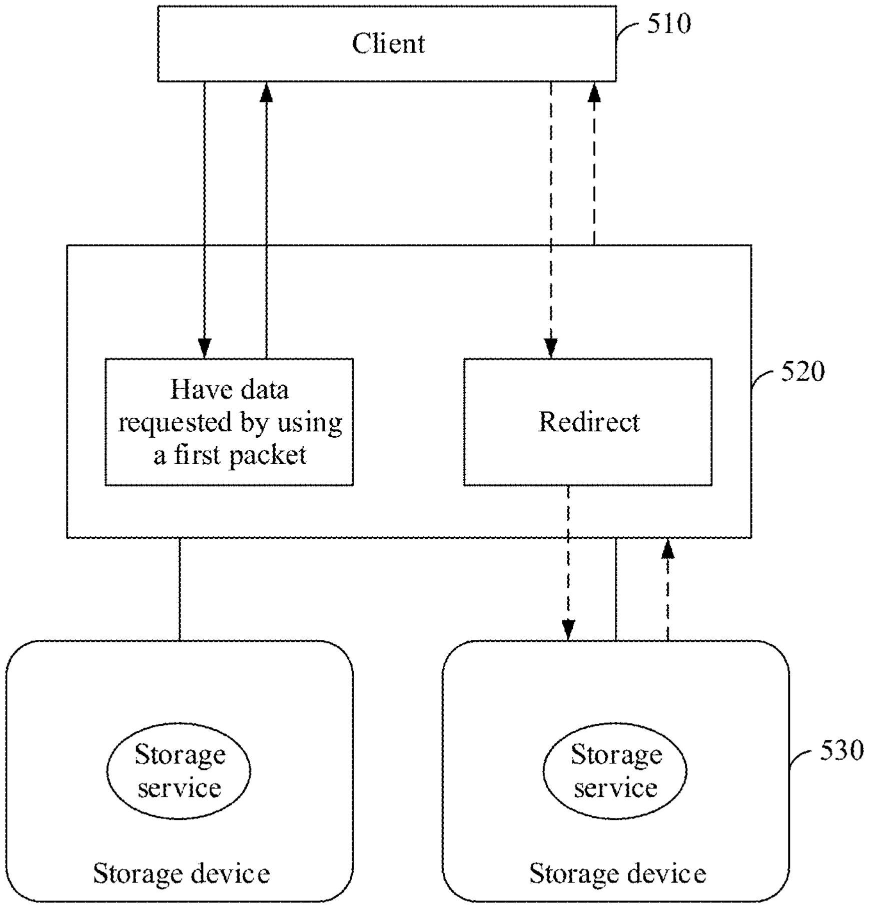
FIG. 6 is a schematic diagram of a method for optimizing data access performance according to an embodiment of this application.

FIG. 6 is a schematic diagram of a method for optimizing data access performance according to an embodiment of this application.

As shown in FIG. 6, an intermediate device located between a client and a server side may be a network device, for example, a programmable network device. There may be one or more clients and server sides.

In a possible embodiment, an intermediate device 520 may receive a first packet sent by a terminal on which the client is located. If the intermediate device 520 determines that data requested by using the first packet exists in the intermediate device, the intermediate device 520 may send the data requested by using the first packet to the terminal on which the client is located. Therefore, the data requested by using the first packet does not need to be obtained from a remote server side (for example, a database or a storage device), thereby improving data access efficiency. Further, performance consumption of the server side is reduced.

In some other possible embodiments, if the intermediate device 520 does not store the data requested by using the first packet, the intermediate device may determine a target server side in which the data requested by using the first packet is located, so that the packet can be forwarded to a corresponding target server side 530 in a redirection manner, thereby avoiding redirection of the first packet between server sides, reducing overheads of redundant traffic of the server side, and improving performance of the server side.

The following describes in detail a method for optimizing data access performance in this application with reference to specific embodiments. Details are not described herein.

Figure 7:
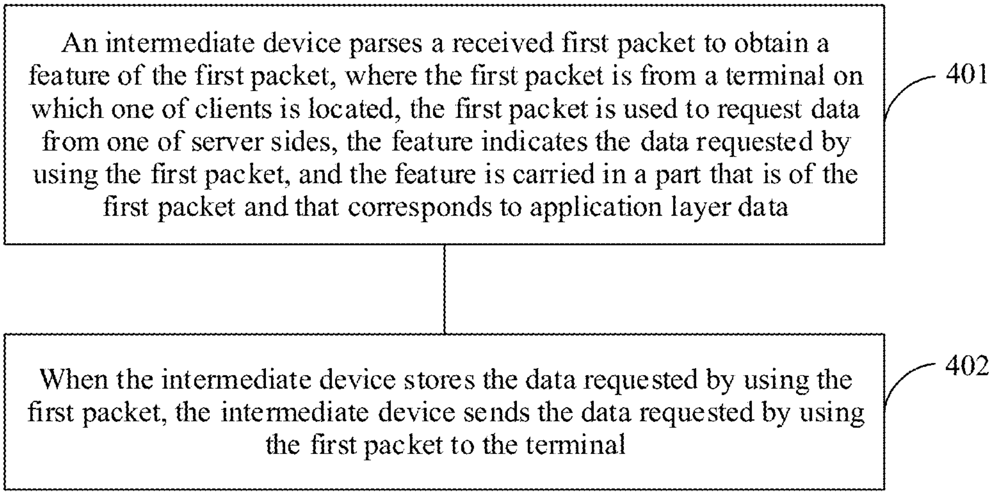
FIG. 7 is a schematic flowchart of a method for optimizing data access performance according to an embodiment of this application.

FIG. 7 is a schematic flowchart of a method for optimizing data access performance according to an embodiment of this application. The method may be applied to an intermediate device in a communication network. The intermediate device may be a network device between a client and a server side. There are one or more clients, and there may be one or more server sides. The method may include operation 401 and operation 402.

The client may be carried in a terminal device, for example, a mobile phone or a personal computer. The server side may include a storage device, a database, or the like. For example, the intermediate device may be a programmable network device, a P4 switch, a network processor (NP), a router, a field-programmable gate array (FPGA), or the like located between the terminal device and the storage device.

401: The intermediate device parses a received first packet to obtain a feature of the first packet, where the first packet is from a terminal on which one of the clients is located, the first packet is used to request data from one of the server sides, the feature indicates the data requested by using the first packet, and the feature is carried in a part that is of the first packet and that corresponds to application layer data.

In this operation, the intermediate device receives the first packet sent by the terminal on which the client is located. The first packet may be a packet used to request a storage service. For example, the first packet may be used to request data from the storage device, or request data from a database. The intermediate device may parse the first packet to obtain the feature of the first packet.

For example, a packet parsing module in the intermediate device may extract the feature of the first packet according to a parsing rule, where the feature may indicate the data requested by using the first packet, and the feature may be carried in the part that is of the first packet and that corresponds to the application layer data. Therefore, the intermediate device may extract the part corresponding to the application layer data in the first packet, to obtain the feature of the first packet.

The intermediate device, the client, and the server side may be located in a same trusted area, for example, may be located in a same trusted communication network. In this case, the data in the first packet may not need to be encrypted. Therefore, the intermediate device may directly extract the part corresponding to the application layer data in the first packet.

The parsing rule may be pre-cached by the intermediate device, or the parsing rule may be sent by the server side to the intermediate device by using a control plane, or may be self-learned by the intermediate device.

In some embodiments, the feature of the first packet includes values of a plurality of fields arranged according to a rule, and the rule indicates a corresponding order of the plurality of fields in the feature of the first packet.

In some embodiments, the plurality of fields may include a scatter-gather list SGL field and a start LBA field.

In some embodiments, when the server side uses the non-volatile memory express over fabrics (NOF), the plurality of fields are the SGL and the start logical block address, and the feature of the first packet may be the SGL and the start logical block address that are in sequence, for example, the SGL is in front of the start logical block address or the start logical block address is in front of the SGL.

In some other embodiments, the plurality of fields may alternatively be the SGL, the start LBA field, and another available field in the NOF protocol.

In some embodiments, an application layer field included in the feature of the first packet is a key-value string.

In some embodiments, when the server side uses the redis serialization protocol (RESP), the application layer field included in the feature of the first packet is the key-value string.

In some embodiments, the first packet is specifically used to request data from a storage device, and the data specifically requested by using the first packet is block data of the storage device.

For example, when the first packet is used to request the data from the storage device, the data requested by using the first packet may be the block data in the storage device. For example, the first packet carries an address of the block data and a length of the block data.

In some embodiments, the first packet is specifically used to request data from a database, and the data specifically requested by using the first packet is a record in the database.

For example, when the first packet is used to request the data from the database, the data requested by using the first packet may be a record in the database.

In some embodiments, there are one or more server sides, the intermediate device stores a mapping relationship between the feature of the first packet and a server side identifier. The method further includes: When the intermediate device does not store the data requested by using the first packet, the intermediate device sends, in a redirection manner based on the feature of the first packet and the mapping relationship between the feature of the first packet and the server side identifier, a second packet to a server side corresponding to the feature of the first packet, where data requested by using the second packet is the same as that requested by using the first packet.

The server side identifier may be an address, an identity (ID), or the like. The address may be a network address, for example, an IP address or a media access control (MAC) address. The ID may also be a tag ID in a case in which a tag technology is used.

The server side identifier may one-to-one correspond to the server side, that is, each server side corresponds to one server side identifier. The feature of the first packet may also one-to-one correspond to the server side identifier, that is, the feature of the first packet may correspond to one server side identifier, so that a corresponding server side may be found based on the feature of the first packet.

It should be understood that the mapping relationship between the feature of the first packet and the server side identifier may be pre-stored in the intermediate device, or the mapping relationship is delivered by the server side to the intermediate device by using the control plane.

It should be noted that the redirection means that the intermediate device may modify a packet header of the first packet to obtain the second packet, and the second packet may be used to access a corresponding server side based on the packet header. The data requested by using the second packet is the same as that requested by using the first packet.

For example, the intermediate device may modify quintuple information of the first packet, to obtain a modified second packet, but the data requested by using the second packet for accessing is the same as that requested by using the first packet.

In this way, when the intermediate device does not have the data requested by using the first packet, a corresponding server side node may be obtained based on the mapping relationship between the feature of the first packet and the server side identifier, so that the modified first packet can be accurately sent to the corresponding server side node, thereby reducing redirection of the first packet between the server side nodes, reducing redundant traffic between the server side nodes, and improving performance of the server side.

In some embodiments, according to the packet header of the first packet, when a server side node that can be accessed by the first packet is consistent with a server side node corresponding to the feature of the first packet, the intermediate device directly sends the first packet to the corresponding server side node.

In this embodiment of this application, when the intermediate device does not store the data requested by using the first packet, and the server side node that can be accessed by the first packet is the same as the server side node corresponding to the feature of the first packet, the intermediate device does not need to modify the packet header of the first packet, and may directly send the first packet to the corresponding server side node.

402: When the intermediate device stores the data requested by using the first packet, the intermediate device sends the data requested by using the first packet to the terminal.

In the operation 401, the intermediate device has obtained, by parsing the first packet, the data requested by using the first packet. When the intermediate device stores the data requested by using the first packet, the intermediate device may send the data requested by using the first packet to the terminal device.

For example, the intermediate device is provided with a cache, and the cache stores data frequently accessed by the terminal device. When the intermediate device determines that the data requested by using the first packet belongs to this part of data, the intermediate device may encapsulate the data requested by using the first packet to form a new reply packet, and send the reply packet to the terminal device.

Specifically, the intermediate device may encapsulate the packet according to a reply rule to form the reply packet. The packet reply rule may also be pre-cached, or the reply rule may be sent by the server side to the intermediate device by using the control plane, may be self-learned by the intermediate device, or the like.

It should be understood that the intermediate device may alternatively be a network forwarding device integrated with the foregoing functions. In this case, the network forwarding device may not be programmable. This is not limited in this embodiment of this application.

In this way, the intermediate device may parse the packet sent by the terminal device, to obtain a feature corresponding to the application layer in the packet, where the feature may indicate the data requested by using the packet. In other words, the intermediate device may learn of, by parsing the first packet, information about to-be-requested data indicated by the first packet. In another aspect, the intermediate device itself may store a part of data. In this way, the intermediate device may perform query at a local end. When the intermediate device determines that the intermediate device stores the data requested by using the packet, the intermediate device may directly send the data requested by using the packet to the terminal device. This technical solution can avoid redirection of the packet between the server side nodes, thereby reducing performance consumption of the server side is reduced and efficiency of accessing the server side by the client is improved.

In some embodiments, the method may further include: The intermediate device receives a third packet, where the third packet is used to request data from one of the server sides, and the third packet is from a terminal on which one of the clients is located.

When a quantity of requested times of the data requested by using the third packet is greater than a threshold, the intermediate device stores the data requested by using the third packet in the intermediate device.

Same as the first packet, the third packet is used to request the data from the one of the server sides. When the quantity of requested times of the data requested by using the third packet is greater than the threshold, the intermediate device may store the data requested by using the third packet in the intermediate device.

For example, the threshold may be dynamically configured by the control plane, and a specific value is not limited in this embodiment of this application.

It should be understood that the third packet and the first packet may be from a same client or a same terminal, or may be from different terminals or clients. This is not limited in this embodiment of this application.

In some embodiments, the data that is requested by using the third packet and that is stored in the intermediate device is requested by the intermediate device from a storage device; or the data that is requested by using the third packet and that is stored in the intermediate device is obtained by the intermediate device from a packet sent by a storage device to a client.

In this example, when the quantity of requested times of the data requested by using the third packet is greater than the threshold, the intermediate device may send a request message to the storage device, to request the data requested by using the third packet, and store the data.

Alternatively, when the quantity of requested times of the data requested by using the third packet is greater than the threshold, the intermediate device may intercept the packet sent by the storage device to the client to obtain the data requested by using the third packet, and store the data.

The packet sent by the storage device to the client is sent in response to a request packet of the client, that is, the packet is a response packet returned by the storage device to the client after the storage device receives the request packet of the client.

The data requested by using the third packet may be stored in a cache of the intermediate device.

In some embodiments, the intermediate device stores the data requested by using the first packet in a cache.

In some embodiments, when the intermediate device does not have the data requested by using the first packet, the intermediate device may obtain the data requested by using the first packet from the reply packet sent by the storage device or the database to the client, and the intermediate device may store the data requested by using the first packet in the cache of the intermediate device.

It should be understood that the following may further describe the technical solutions in FIG. 7 with reference to FIG. 8 to FIG. 15.

Figure 8:
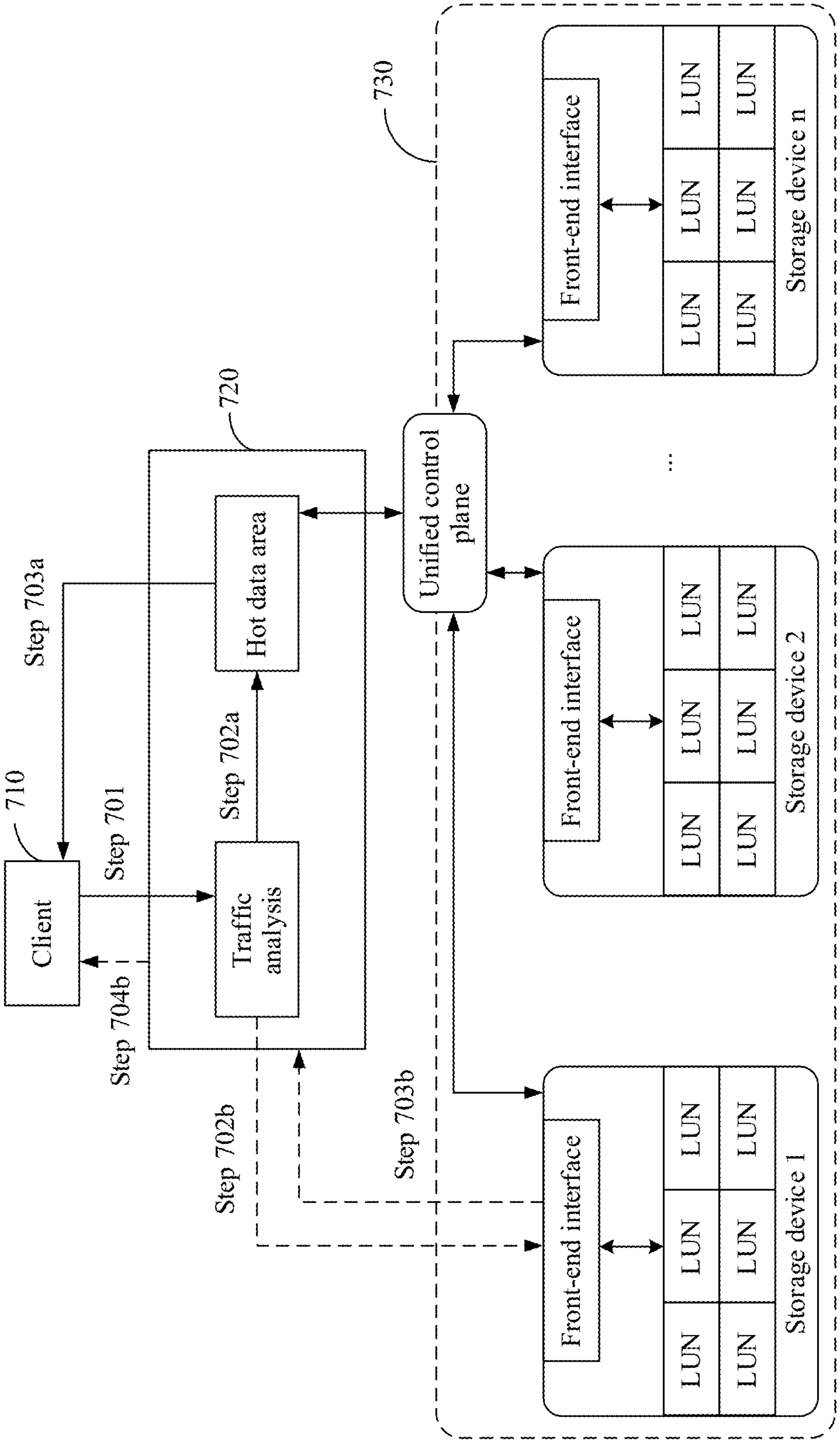
FIG. 8 is a schematic diagram of accessing a storage device by a client according to an embodiment of this application.

FIG. 8 is a schematic diagram of accessing a storage device by a client according to an embodiment of this application.

As shown in FIG. 8, in a possible embodiment, operations of accessing the storage device by a terminal 710 in which the client is located by using an intermediate device 720 may include operation 701 to operation 703*a*. The intermediate device may be a network device between the client and the storage device, for example, a network switch.

- 701: The intermediate device receives a packet sent by the terminal on which the client is located, and a traffic analysis module in the intermediate device may determine, based on feature data in the packet, whether the packet accesses hot data.

A hot data area is disposed in the intermediate device, and is used to cache the hot data. The hot data may be pre-stored in the intermediate device by the storage device, or may be sent by the storage device to the intermediate device in real time by using a control plane.

- 702*a*: Send the packet to the hot data area of the intermediate device for processing when it is determined that the packet accesses the hot data.

In some other embodiments, when it is determined that the data requested by using the packet is stored in the intermediate device, the packet is sent to a data cache.

- 703*a*: The hot data area encapsulates the hot data accessed by the packet to form a pickup packet, and sends the pickup packet to the terminal.

When determining that the packet of the terminal accesses the hot data, the intermediate device may directly encapsulate the hot data to form the pickup packet, so that the intermediate device does not need to remotely access the storage device, thereby improving a data access speed and efficiency and further reducing performance consumption of the storage device.

In another possible embodiment, the operations of accessing the storage device by the client 710 by using the intermediate device 720 may include operation 701 to operation 704*b*.

- 701: The intermediate device receives a packet sent by a terminal, and a traffic analysis module in the intermediate device may determine, based on feature data in the packet, whether the packet accesses hot data.
- 702*b*: Send the packet to a corresponding storage device 1 when it is determined that the packet does not access the hot data.

In some other embodiments, when data requested by using the packet does not exist in the intermediate device, the packet is sent to the corresponding storage device 1.

703*b*: The storage device 1 encapsulates the data requested by using the packet to obtain a reply packet, and sends the reply packet to the intermediate device 720.

704*b*: The intermediate device 720 sends the reply packet to the client 710.

In this embodiment of this application, when the intermediate device determines that the packet of the client does not access the hot data, or the data accessed by the packet does not exist in the intermediate device, the intermediate device may determine, based on a feature of the packet, a storage device in which the data requested by using the packet is located, and directly send the packet to the corresponding storage device, thereby improving data access efficiency. The following describes the technical solution with reference to FIG. 12 and FIG. 13. It should be understood that the technical solution in FIG. 12 and FIG. 13 may be performed based on FIG. 8. For example, in another embodiment, the technical solution in FIG. 8 may be combined with the technical solution in FIG. 12 or FIG. 13.

Figure 9:
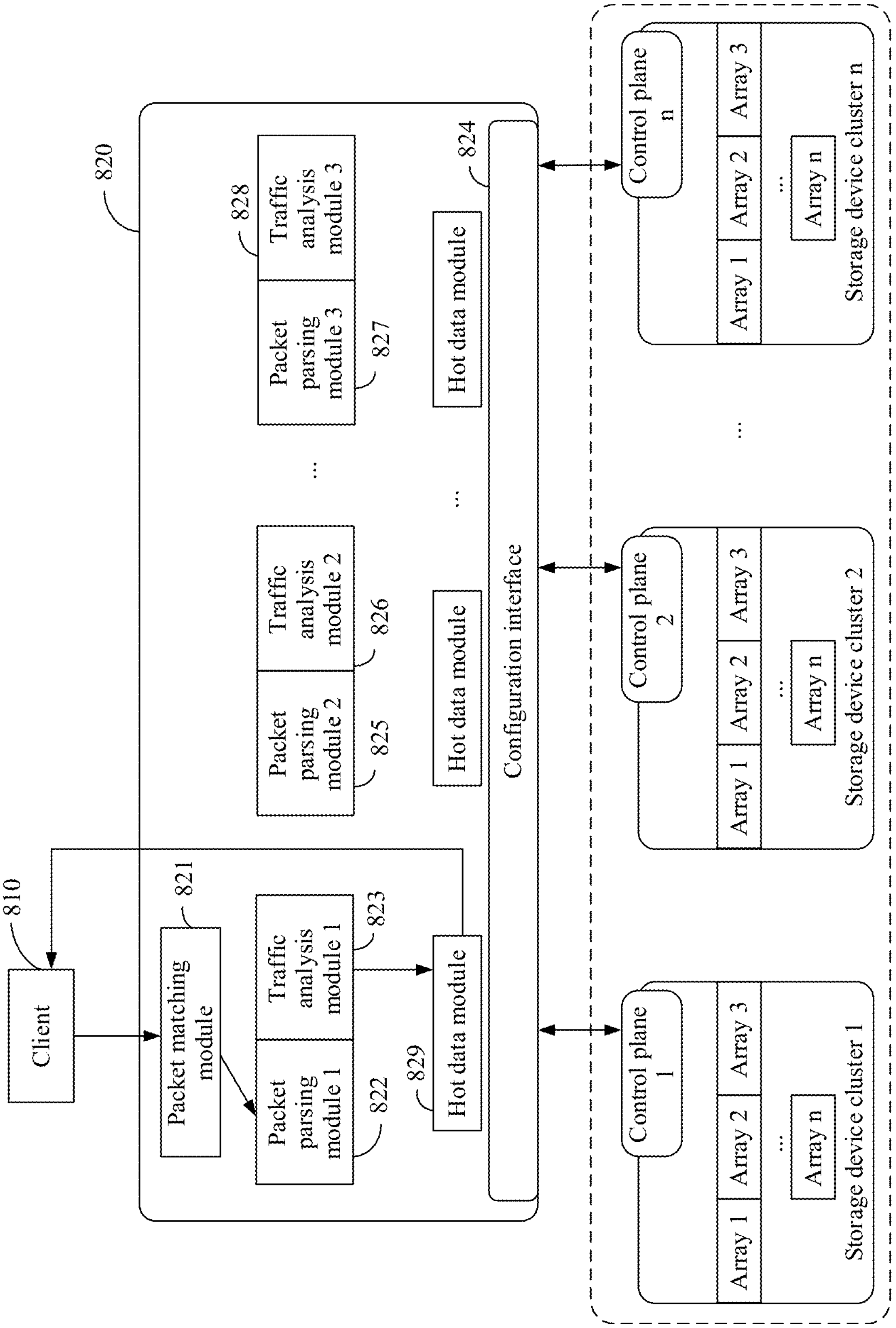
FIG. 9 is a schematic diagram of optimizing data access performance according to an embodiment of this application.

FIG. 9 is a schematic diagram of optimizing data access performance according to an embodiment of this application.

Refer to FIG. 9. A storage device cluster 1 may include a storage array 1, a storage array 2, . . . , and a storage array n.

In this embodiment of this application, an intermediate device 820 receives a first packet sent by a client 810.

Specifically, a packet matching module 821 in the intermediate device 820 filters the first packet according to a packet matching rule, and sends the first packet to a packet parsing module 822 when determining that the first packet belongs to a packet for accessing a storage service; or forwards the first packet to an original packet forwarding module when determining that the first packet does not belong to a packet for accessing a storage service.

It should be understood that, in this embodiment of this application, that the packet matching module 821 sends the first packet to the packet parsing module 822 is merely an example. In another embodiment, the packet matching module 821 may also send the first packet to another packet parsing module, for example, a packet parsing module 825.

The packet matching rule may include at least one of the following content: a source address, a destination address, a source port, a destination port, and a field of an application layer protocol.

It should be understood that the packet matching rule may be sent by a storage device cluster to an intermediate device by using a control plane through a configuration interface. For example, the packet matching rule may be sent by the storage device cluster 1 to the intermediate device 820 by using a control plane 1 through a configuration interface 824, or may be pre-cached in the intermediate device 820. Alternatively, the packet matching rule may be sent by a storage device cluster 2 to the intermediate device 820 by using a control plane 2. This is not limited in this embodiment of this application.

The packet parsing module 822 may parse the first packet according to a parsing rule to obtain a feature of the first packet, and the feature of the first packet may include values of a plurality of fields arranged according to a rule, and the rule may indicate a corresponding order of the plurality of fields in the feature of the first packet.

The plurality of fields include a scatter and gather table SGL field and a start LBA field. The rule may be that the SGL field is before the start LBA field, or the rule may be that the SGL field is after the start LBA field.

In some embodiments, when the non-volatile memory express over fabrics NOF is used, the plurality of fields are the SGL field and the start LBA field.

In some embodiments, when RESP is used, an application layer field included in the feature of the first packet is a key-value string.

The packet parsing module 822 sends the feature of the first packet obtained through parsing to a traffic analysis module 823, and the traffic analysis module 823 determines, based on a quantity of counting times of the data requested by using the first packet, whether the packet requests hot data. In some other embodiments, if failing to obtain the feature of the first packet through parsing, the packet parsing module 822 forwards the first packet to the original packet forwarding module.

If the quantity of counting times of the data requested by using the first packet is greater than a first preset value, it is determined that the data requested by using the first packet belongs to the hot data. When it is determined that the data requested by using the first packet belongs to the hot data, the first packet may be transferred to a hot data module 829. If the quantity of counting times of the data requested by using the first packet is less than or equal to the first preset value, it is determined that the data requested by using the first packet is not the hot data, and the first packet is forwarded to the original packet forwarding module.

When the data requested by using the first packet belongs to the hot data, the hot data module 829 may obtain a data value of the hot data based on a feature value in the first packet, and encapsulate the data requested by using the first packet according to a packet pickup rule, to obtain a pickup packet.

The packet pickup rule may include rules such as modification of a layer 2 or layer 3 address of the packet, modification of a status field at a service layer, and modification of a check field. The packet pickup rule may be sent by the storage device cluster 1 to the intermediate device 820 by using the control plane 1 through the configuration interface 824, or may be pre-cached in the intermediate device 820.

It should be understood that the hot data included in the hot data module may be sent by the storage device cluster to the intermediate device by using the control plane. For example, the hot data included in the hot data module 829 may be sent by the storage device cluster 1 to the intermediate device by using the control plane 1.

Alternatively, the hot data included in the hot data module may be pre-stored in the intermediate device, or the hot data included in the hot data module may be obtained by the intermediate device from the packet sent by the storage device cluster 1 to the client.

When the hot data changes, the intermediate device may send a hot data synchronization request to the storage device cluster 1, receive a packet that is returned by the storage device cluster 1 and that carries the hot data, and update the hot data in the packet to the hot data module.

The hot data module 829 sends the pickup packet to the client 810.

In this way, the intermediate device located between the client and the storage device may parse the received packet, and determine whether the packet requests the hot data. When the packet requests the hot data, the intermediate device may directly send the data requested by using the packet to the client. In this technical solution, the data requested by using the packet does not need to be obtained from a remote storage device, and the intermediate device may directly pick up the packet, so that data access efficiency can be improved and performance consumption of the storage device can be reduced.

Figure 10:
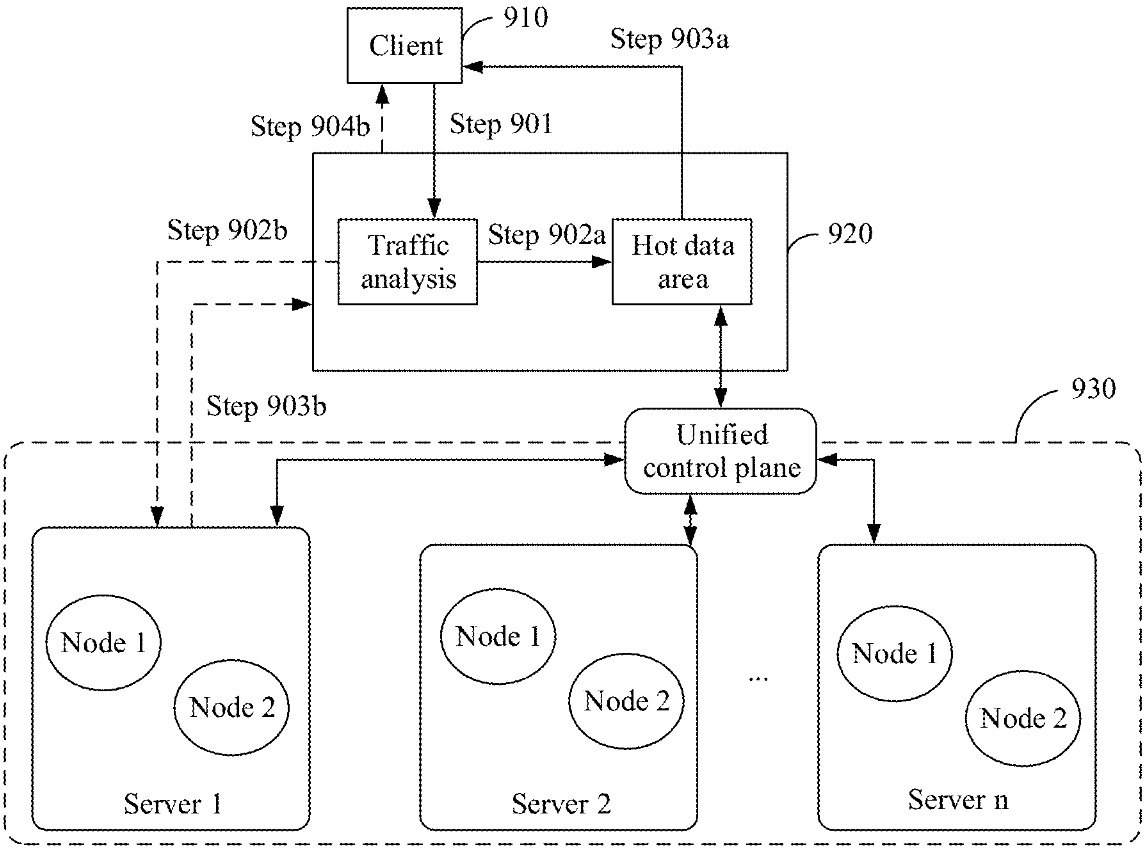
FIG. 10 is a schematic diagram of accessing a database by a client according to an embodiment of this application.

It should be understood that the technical solution in FIG. 8 may be used as a part of FIG. 9. In another embodiment, the technical solution in FIG. 9 may also be combined with the technical solution in FIG. 12 or FIG. 13. FIG. 10 is a schematic diagram of accessing a database by a client according to an embodiment of this application.

Refer to FIG. 10. Each server may include a plurality of database container nodes, and a plurality of servers may form a database cluster 930. For an intermediate device 920, refer to the related description in FIG. 7.

It should be understood that, for operation 901 to operation 903*a*, refer to the related descriptions of operation 701 to operation 703*a*. For brevity, details are not described again.

902*b*: When determining that data requested by using the packet is not hot data, a traffic analysis module sends the packet to a corresponding database node.

903*b*: The database node encapsulates the data requested by using the packet to form a reply packet, and sends the reply packet to the intermediate device 920.

904*b*: The intermediate device 920 sends the reply packet to the client 910.

In this way, when determining that the packet of the client requests the hot data, the intermediate device may directly encapsulate the hot data to form a pickup packet, so that the intermediate device does not need to remotely access the database node, thereby improving a data access speed and efficiency and further reducing performance consumption of the database.

Further, when the intermediate device determines that the packet of the client does not request the hot data, or the data requested by using the packet does not exist in the intermediate device, the intermediate device may determine, based on a feature of the packet, a database node in which the data requested by using the packet is located, and directly send the packet to the corresponding database node, thereby improving data access efficiency. The following describes the technical solution with reference to FIG. 14 and FIG. 15. It should be understood that the technical solution in FIG. 14 and FIG. 15 may be performed based on FIG. 10. For example, in another embodiment, the technical solution in FIG. 10 may be combined with the technical solution in FIG. 14 or FIG. 15.

Figure 11:
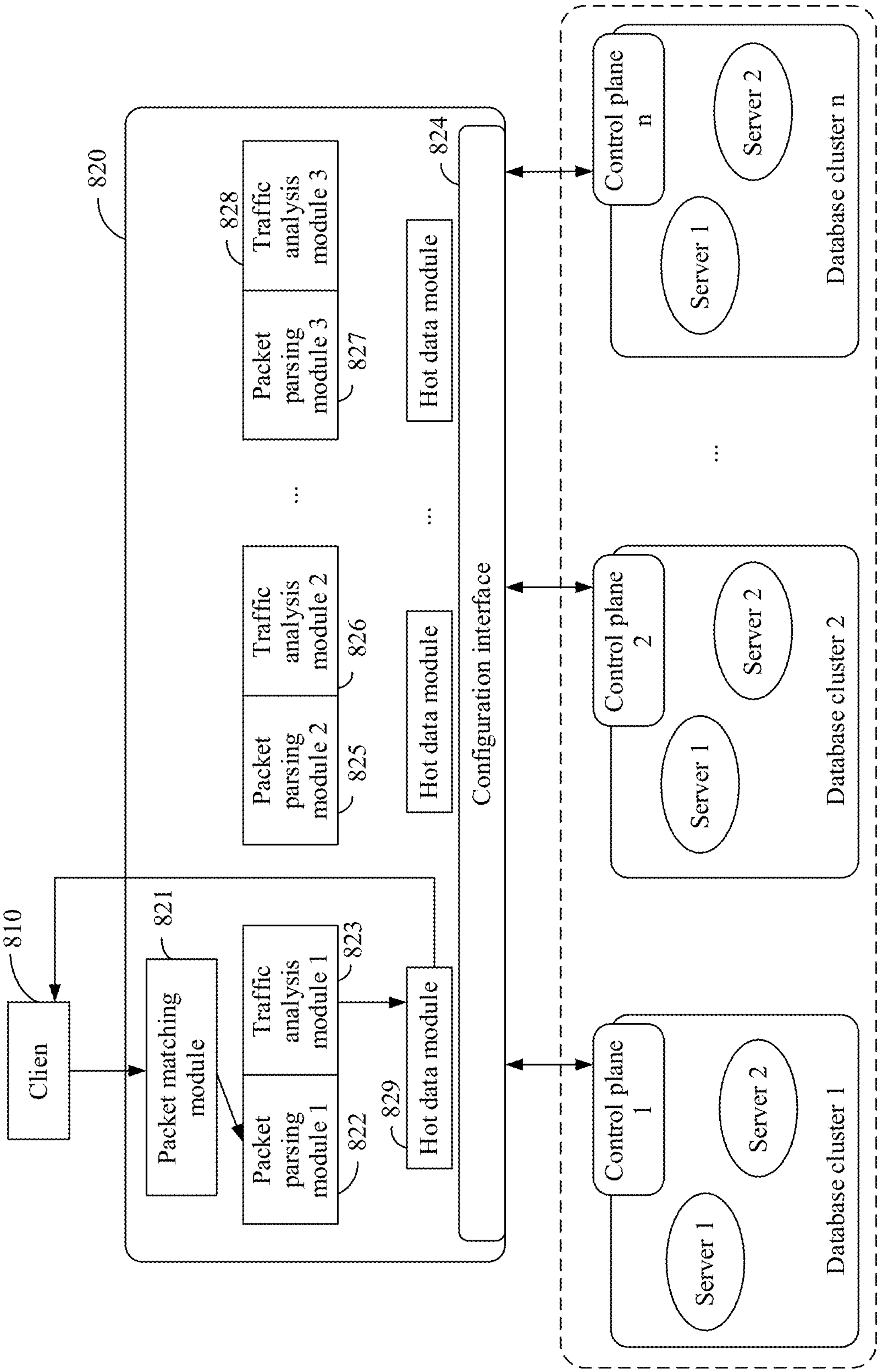
FIG. 11 is a schematic diagram of optimizing data access performance according to an embodiment of this application.

FIG. 11 is a schematic diagram of optimizing data access performance according to an embodiment of this application.

Refer to FIG. 11. Each database cluster may include a server 1 to a server n in FIG. 10.

It should be understood that, for related descriptions of the packet matching module, the packet parsing module, the traffic analysis module, the hot data module, and the configuration interface of the intermediate device 820 in this embodiment of this application, refer to the descriptions in FIG. 8. For brevity, details are not described again.

In this way, the intermediate device located between the client and the database may parse the received packet, and determine whether the packet requests the hot data. When the packet requests the hot data, the intermediate device may directly send the data requested by using the packet to the client. In this technical solution, the data requested by using the packet does not need to be obtained from a remote database node, and the intermediate device may directly pick up the packet, so that data access efficiency can be improved and performance consumption of the database can be reduced.

It should be understood that the technical solution in FIG. 11 may include the technical solution in FIG. 10. In another embodiment, the technical solution in FIG. 11 may also be combined with the technical solution in FIG. 14 or FIG. 15.

Figure 12:
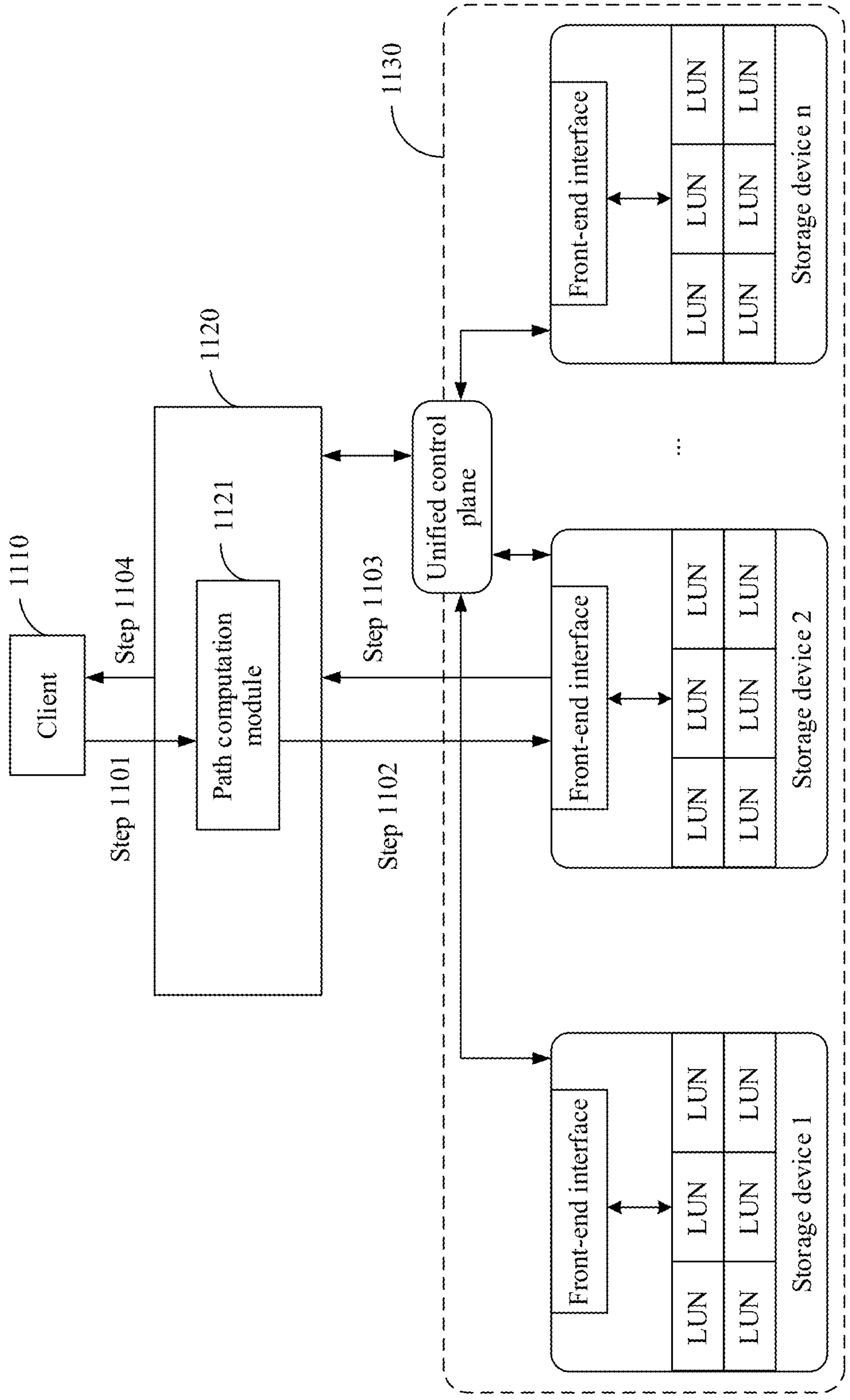
FIG. 12 is a schematic diagram of accessing a storage device by a client according to an embodiment of this application.

FIG. 12 is a schematic diagram of accessing a storage device by a client according to an embodiment of this application.

As shown in FIG. 12, a process in which a terminal on which the client is located accesses the storage device may include operation 1101 to operation 1104.

1101: An intermediate device 1120 receives a first packet sent by a client 1110.

A path computation module 1121 in the intermediate device 1120 may determine, based on a feature of the first packet, a target storage device in which data requested by using the first packet for accessing is located.

In some embodiments, the path computation module 1121 determines, based on the feature of the first packet and a mapping relationship between the feature of the first packet and a storage device identifier, the target storage device in which the data requested by using the first packet is located.

Specifically, the path computation module 1121 may perform computation on the feature of the first packet according to a path computation algorithm, and determine, based on a computation result and the mapping relationship between the feature of the first packet and the storage device identifier, the target storage device in which the data requested by using the first packet is located. For example, the path computation module 1121 performs a modulo operation on the feature of the first packet according to a hash algorithm (for example, cyclic redundancy check (CRC) 16, CRC 32, or another hash polynomial parameter), and the path computation module 1121 may further perform computation on the feature of the first packet according to another algorithm. This is not limited in this embodiment of this application.

1102: The intermediate device 1120 forwards the packet to the target storage device.

In a possible embodiment, the intermediate device sends a second packet to the target storage device in a redirection manner, where data requested by using the second packet is the same as that requested by using the first packet.

It should be understood that the second packet may be obtained by the intermediate device by modifying quintuple information of a packet header of the first packet based on a location of the target storage device, so that the intermediate device can forward the second packet to the target storage device.

In another possible embodiment, if the quintuple information of the packet header of the first packet corresponds to the target storage device, the intermediate device may directly forward the first packet to the target storage device without redirection.

1103: The target storage device encapsulates the data requested by using the first packet to form a reply packet, and sends the reply packet to the intermediate device 1120.

1104: The intermediate device 1120 forwards the reply packet to the client 1110.

It should be understood that the intermediate device shares a packet path orientation function for the storage device, so that performance consumption of the storage device can be reduced. Further, in this solution, redirection of the packet between the storage devices is avoided, thereby reducing redundant traffic inside the storage device and increasing a throughput.

Figure 13:
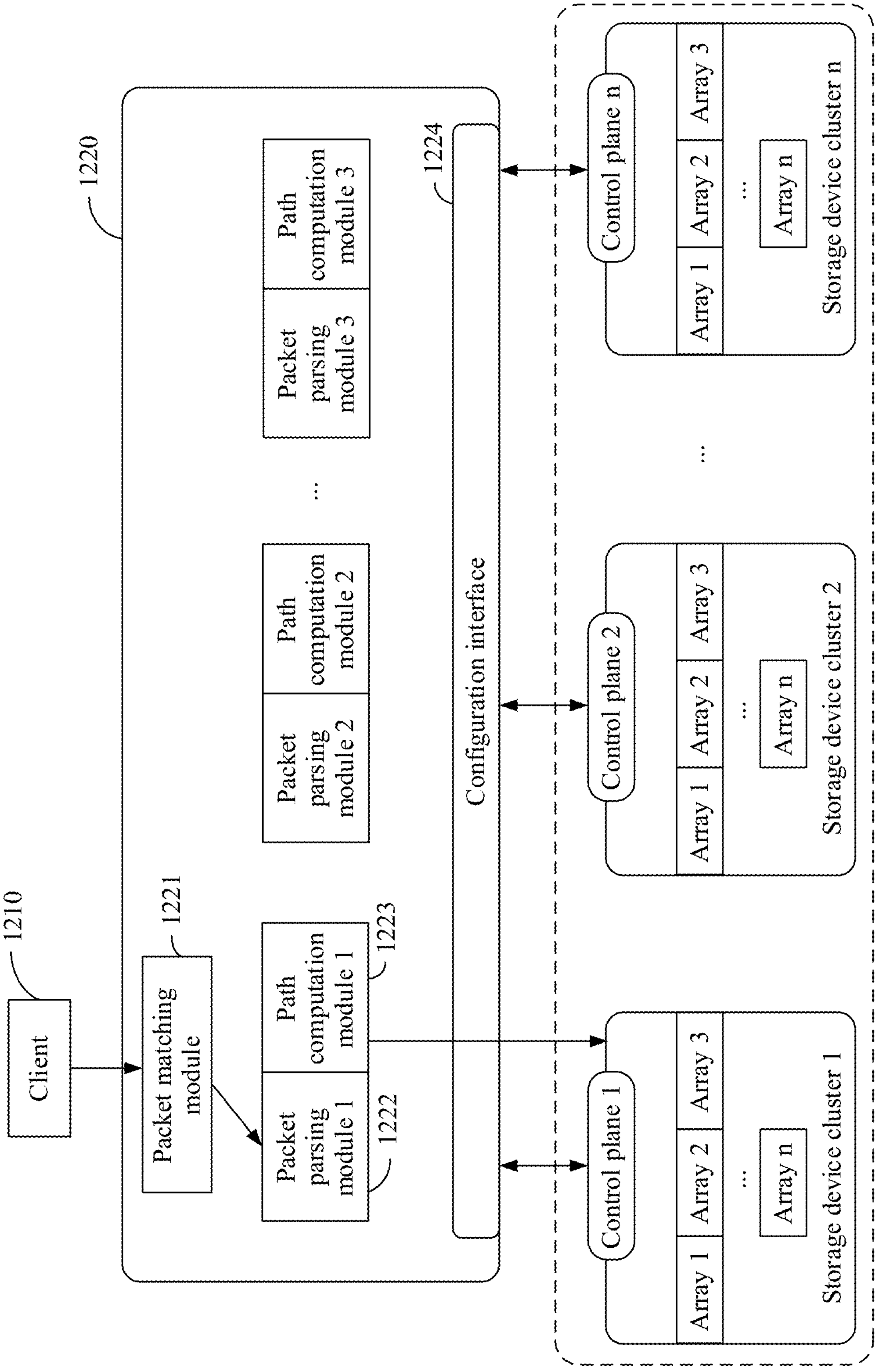
FIG. 13 is a schematic diagram of a method for optimizing data access performance according to an embodiment of this application.

FIG. 13 is a schematic diagram of a method for optimizing data access performance according to an embodiment of this application.

Refer to FIG. 13. A storage device cluster 1 may include a storage array 1, a storage array 2, . . . , and a storage array n.

In this embodiment of this application, an intermediate device 1220 receives a first packet sent by a client 1210.

Specifically, a packet matching module 1221 in the intermediate device 1220 filters the first packet according to a packet matching rule, determines a storage device cluster 1 corresponding to the first packet when determining that the first packet belongs to a packet for accessing a storage service, and forwards the first packet to a packet parsing module 1222; or forwards the first packet to an original packet forwarding module when determining that the first packet does not belong to a packet for accessing a storage service.

It should be understood that, in this embodiment of this application, this is merely an example in which the packet matching module 1221 filters the first packet according to the packet matching rule, determines the storage device cluster 1 corresponding to the first packet when determining that the first packet belongs to the packet for accessing the storage service, and then forwards the first packet to the packet parsing module 1222. In another embodiment, the packet parsing module 1222 in the intermediate device 1220 may filter the first packet according to a packet matching rule, determine a storage device cluster 2 corresponding to the first packet when determining that the first packet belongs to the packet for accessing the storage service, and then forward the first packet to the packet parsing module 2.

The packet matching rule may include at least one of the following content: a source address, a destination address, a source port, a destination port, and a field of an application layer protocol.

The packet parsing module 1222 may parse the first packet according to a parsing rule to obtain a feature of the first packet, and the feature of the first packet may include values of a plurality of fields arranged according to a rule, and the rule may indicate a corresponding order of the plurality of fields in the feature of the first packet.

The plurality of fields include a scatter and gather table SGL field and a start LBA field. The rule may be that the SGL field is before the start LBA field, or the rule may be that the SGL field is after the start LBA field.

It should be understood that, in different protocols, fields included in the feature of the first packet are different. For example, when the non-volatile memory express over fabrics NOF is used, the feature of the first packet includes a plurality of fields, and the plurality of fields are the SGL field and the start LBA field. When RESP is used, an application layer field included in the feature of the first packet is a key-value string.

The packet parsing module 1222 sends the feature of the first packet obtained through parsing to the path computation module 1223, and the path computation module 1223 determines, based on the feature of the first packet and a mapping relationship between the feature of the first packet and a storage device identifier, a target storage device in which data requested by using the first packet is located.

Specifically, the path computation module 1223 may perform computation on the feature of the first packet according to a path computation algorithm, and determine, based on a computation result and the mapping relationship between the feature of the first packet and the storage device identifier, the target storage device in which the data requested by using the first packet is located. For example, the path computation module 1123 performs a modulo operation on the feature of the first packet according to a hash algorithm (for example, CRC 16, CRC 32, or another hash polynomial parameter), and the path computation module 1123 may further perform computation on the feature of the first packet according to another algorithm. This is not limited in this embodiment of this application.

The storage device identifier may be an address, an ID, or the like. The address may be a network address, for example, an IP address or a MAC address. The ID may also be a tag ID in a case in which a tag technology is used.

In some embodiments, after the target storage device is determined, the path computation module 1223 sends a second packet to the target storage device in a redirection manner, where data requested by using the second packet is the same as that requested by using the first packet. It should be understood that the second packet may be obtained by the intermediate device by modifying quintuple information of a packet header of the first packet based on a location of the target storage device, so that the intermediate device can forward the second packet to the target storage device.

In some other embodiments, after the target storage device is determined, if the quintuple information of the packet header of the first packet corresponds to the target storage device, the intermediate device may directly forward the first packet to the target storage device without redirection.

It should be understood that the packet matching rule, the packet parsing rule, the mapping relationship between the feature of the first packet and the storage device identifier, the path computation algorithm, and the like may be sent by the storage device cluster to the intermediate device 1220 by using the control plane through the configuration interface 1224. Alternatively, the foregoing rules may be pre-stored in the intermediate device 1220.

It should be understood that the intermediate device may obtain, based on the mapping relationship between the feature of the first packet and the storage device identifier, the target storage device corresponding to the first packet, so that the modified first packet can be accurately sent to the corresponding storage device, thereby reducing redirection of the first packet between the storage devices, reducing redundant traffic between the storage devices, and improving performance of the storage device.

Figure 14:
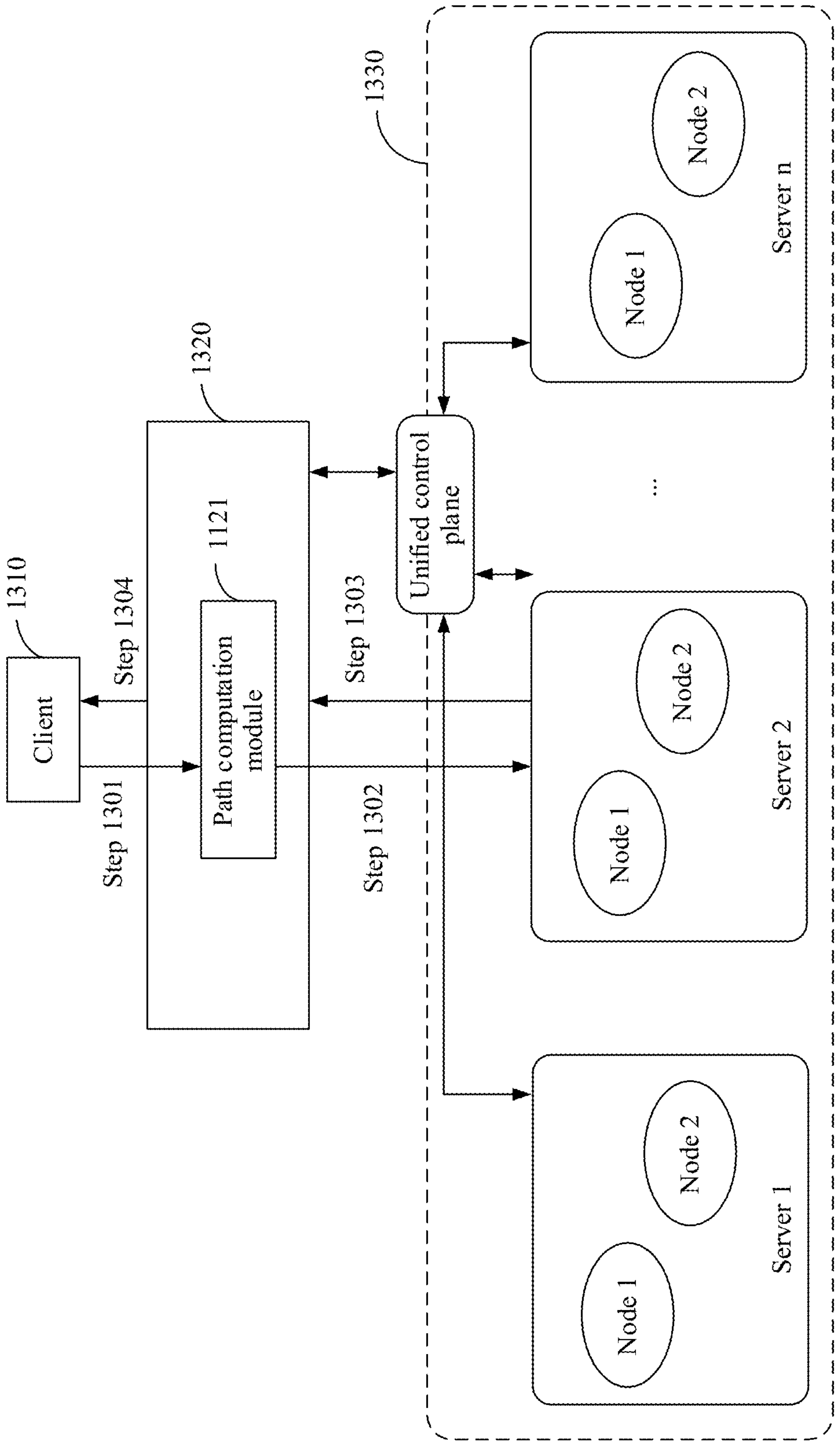
FIG. 14 is a schematic diagram of accessing a database by a client according to an embodiment of this application.

FIG. 14 is a schematic diagram of accessing a database by a client according to an embodiment of this application.

As shown in FIG. 14, a single server includes one or more DB container nodes, and a plurality of servers form a DB cluster. An intermediate device 1320 has a path computation module 1321, and the intermediate device 1320 may be a programmable network forwarding device, a P4 switch, a network processor, a field programmable gate array, or the like. In this embodiment, a process in which the client accesses the database may include operation 1301 to operation 1304.

1301: The intermediate device 1320 receives a first packet sent by a client 1310.

Specifically, the path computation module 1321 in the intermediate device 1320 may determine, based on a feature of the first packet, a target database node in which data requested by using the first packet for accessing is located.

In some embodiments, the path computation module 1321 determines, based on the feature of the first packet and a mapping relationship between the feature of the first packet and a database identifier, the target database node in which the data requested by using the first packet is located.

Specifically, the path computation module 1321 may perform computation on the feature of the first packet according to a path computation algorithm, and determine, based on a computation result and the mapping relationship between the feature of the first packet and the database identifier, the target database node in which the data requested by using the first packet is located. For example, the path computation module 1321 performs a modulo operation on the feature of the first packet according to a hash algorithm (for example, CRC 16, CRC 32, or another hash polynomial parameter), and the path computation module 1321 may further perform computation on the feature of the first packet according to another algorithm. This is not limited in this embodiment of this application.

1302: The intermediate device 1320 forwards the packet to the target database node.

In a possible embodiment, the intermediate device sends a second packet to the target database node in a redirection manner, where data requested by using the second packet is the same as that requested by using the first packet.

It should be understood that the second packet may be obtained by the intermediate device by modifying quintuple information of a packet header of the first packet based on a location of the target database node, so that the intermediate device can forward the second packet to the target database node.

In another possible embodiment, if the quintuple information of the packet header of the first packet corresponds to the target database node originally, the intermediate device may directly forward the first packet to the target database node without redirection.

1303: The target database node encapsulates the data requested by using the first packet to form a reply packet, and sends the reply packet to the intermediate device 1320.

1304: The intermediate device 1320 forwards the reply packet to the client 1310.

In this embodiment of this application, the intermediate device has the path computation module, and may compute the target database node in which the data actually accessed by the packet is located, so that the packet can be directly forwarded to the target database node, thereby reducing redirection of the packet between the nodes in the database cluster and improving database performance.

Figure 15:
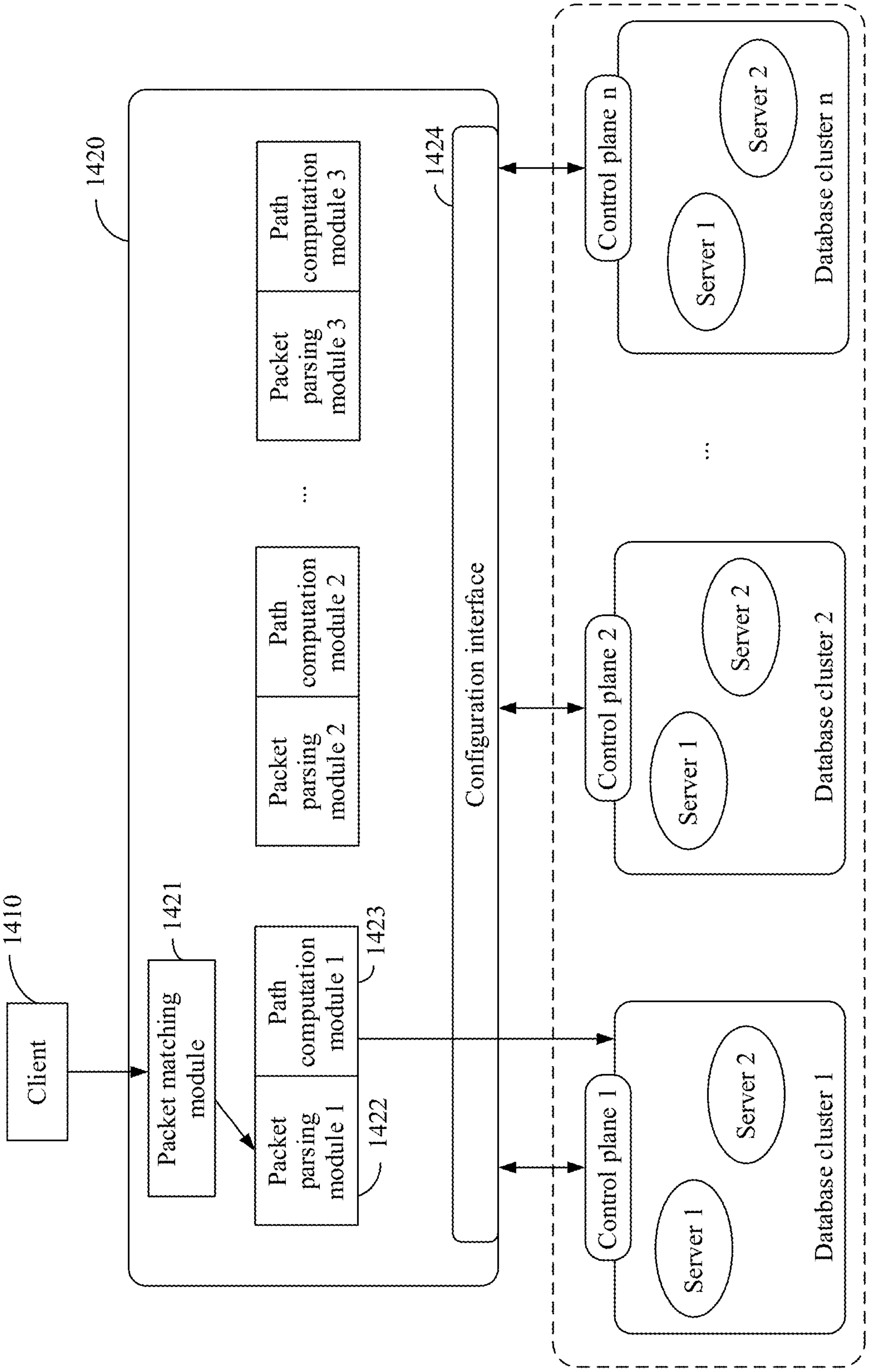
FIG. 15 is a schematic diagram of a solution for optimizing database performance according to an embodiment of this application.

FIG. 15 is a schematic diagram of a solution for optimizing database performance according to an embodiment of this application.

Refer to FIG. 15. Each database cluster may include a server 1 to a server n in FIG. 14.

It should be understood that, for related descriptions of the packet matching module, the packet parsing module, the path computation module, and the configuration interface of the intermediate device 1420 in this embodiment of this application, refer to the descriptions in FIG. 12. For brevity, details are not described again.

In this way, the intermediate device located between the client and the database may parse the received packet, and may compute the target database node in which the data actually accessed by the packet is located, so that the packet may be directly forwarded or forwarded to the target database node in the redirection manner, thereby avoiding redirection of the packet between the nodes in the database cluster and improving database performance.

The foregoing describes in detail the method embodiments for optimizing data access performance in this application with reference to FIG. 1 to FIG. 15. The following describes an apparatus embodiment of this application with reference to FIG. 16. The apparatus embodiment corresponds to the method embodiment. Therefore, for a part that is not described in detail, refer to related descriptions in the foregoing method embodiments.

Figure 16:
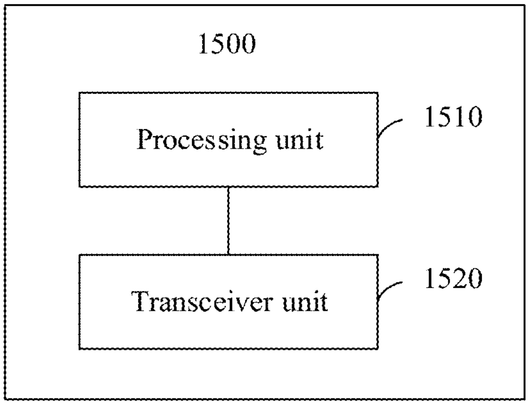
FIG. 16 is a schematic block diagram of an intermediate device in a communication network according to an embodiment of this application.

FIG. 16 is a schematic block diagram of an intermediate device in a communication network according to an embodiment of this application.

As shown in FIG. 16, an intermediate device 1500 is a network device between a client and a server side, there are one or more clients, and there are one or more server sides. The intermediate device 1500 may include a processing unit 1510 and a transceiver unit 1520.

The processing unit 1510 is configured to parse a received first packet to obtain a feature of the first packet, where the first packet is from a terminal on which one of the clients is located, the first packet is used to request data from one of the server sides, the feature indicates the data requested by using the first packet, and the feature is carried in a part that is of the first packet and that corresponds to application layer data.

The transceiver unit 1520 is configured to: when the intermediate device stores the data requested by using the first packet, send the data requested by using the first packet to the terminal.

The processing unit 1510 may be the packet matching module, the packet parsing module, the traffic analysis module, the path computation module, or the like in the foregoing embodiments.

The transceiver unit 1520 may be the unit responsible for receiving and sending the packet in the foregoing embodiment.

In some embodiments, the feature of the first packet includes values of a plurality of fields arranged according to a rule, and the rule indicates a corresponding order of the plurality of fields in the feature of the first packet.

In some embodiments, the plurality of fields include a scatter-gather list SGL field and a start LBA field.

In some embodiments, there are one or more server sides, the intermediate device stores a mapping relationship between the feature of the first packet and a server side identifier, and the transceiver unit 1520 is further configured to:

when the intermediate device does not store the data requested by using the first packet, send, by the intermediate device in a redirection manner based on the feature of the first packet and the mapping relationship between the feature of the first packet and the server side identifier, a second packet to a server side corresponding to the feature of the first packet, where data requested by using the second packet is the same as that requested by using the first packet.

In some embodiments, the first packet is specifically used to request data from a storage device, and the data specifically requested by using the first packet is block data of the storage device.

In some embodiments, the first packet is specifically used to request data from a database, and the data specifically requested by using the first packet is a record in the database.

In some embodiments, the transceiver unit 1520 is further configured to receive a third packet, where the third packet is used to request data from one of the server sides, and the third packet is from a terminal on which one of the clients is located.

The processing unit 1510 is further configured to: when a quantity of requested times of the data requested by using the third packet is greater than a threshold, store the data requested by using the third packet in the intermediate device.

In some embodiments, the data that is requested by using the third packet and that is stored in the intermediate device is requested by the intermediate device from a storage device; or the data that is requested by using the third packet and that is stored in the intermediate device is obtained by the intermediate device from a packet sent by a storage device to a client.

In some embodiments, the intermediate device stores the data requested by using the first packet in a cache.

In some embodiments, an application layer field included in the feature of the first packet is a key-value string.

An embodiment of this application further provides an intermediate device in a communication network, including one or more processors and one or more memories. The one or more memories store one or more computer programs, the one or more computer programs include instructions, and when the instructions are executed by the one or more processors, the method for optimizing data access performance in any one of the foregoing embodiments is performed.

An embodiment of this application further provides a chip. The chip includes a processor and a communication interface, the communication interface is configured to receive a signal and transmit the signal to the processor, and the processor processes the signal, so that the method for optimizing data access performance in any one of the foregoing embodiments is performed.

An embodiment of this application further provides a computer-readable storage medium. The computer-readable storage medium stores computer instructions, and when the computer instructions are run on a computer, the method for optimizing data access performance according to any one of the foregoing embodiments is performed.

An embodiment of this application provides a computer program product. When the computer program product is run on a computer, the computer is enabled to perform the foregoing related operations, to implement the method for optimizing data access performance in the foregoing embodiment.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the method for optimizing data access performance in the foregoing method embodiments.

The electronic device, the computer-readable storage medium, the computer program product, or the chip provided in embodiments is configured to perform the corresponding method provided above. Therefore, for beneficial effects that can be achieved, refer to the beneficial effects in the corresponding method provided above. Details are not described herein again.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in actual embodiment. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for optimizing data access performance, comprising:

parsing, by an intermediate device in a communication network, a received first packet to obtain a feature of the first packet, wherein the intermediate device is a network device between a client and a server side, there are one or more clients, there are one or more server sides, and wherein the first packet is from a terminal on which one of the one or more clients is located, the first packet is used to request data from one of the one or more server sides, the feature indicates the data requested by using the first packet, and the feature is carried in a part that is of the first packet and that corresponds to application layer data;

when the intermediate device stores the data requested by using the first packet, sending, by the intermediate device, the data requested by using the first packet to the terminal;

receiving, by the intermediate device, a third packet, wherein the third packet is used to request data from one of the one or more server sides, and the third packet is from a terminal on which one of the one or more clients is located; and when a quantity of requested times of the data requested by using the third packet is greater than a threshold, storing, by the intermediate device, the data requested by using the third packet in the intermediate device, wherein the threshold is maintained per feature to indicate a number of times data is requested using the feature, and the quantity of requested times is aggregated by the intermediate device irrespective of which terminals send the requests.

2. The method according to claim 1, wherein the feature of the first packet comprises values of a plurality of fields arranged according to a rule, and the rule indicates a corresponding order of the plurality of fields in the feature of the first packet.

3. The method according to claim 2, wherein the plurality of fields comprise a scatter-gather list (SGL) field and a start logical block address (start LBA) field.

4. The method according to claim 1, wherein the intermediate device stores a mapping relationship between the feature of the first packet and a server side identifier, and the method further comprises:

when the intermediate device does not store the data requested by using the first packet, sending, by the intermediate device in a redirection manner based on the feature of the first packet and the mapping relationship between the feature of the first packet and the server side identifier, a second packet to a server side corresponding to the feature of the first packet, wherein data requested by using the second packet is the same as that requested by using the first packet.

5. The method according to claim 1, wherein the first packet is used to request data from a storage device, and the data requested by using the first packet is block data of the storage device.

6. The method according to claim 1, wherein the first packet is used to request data from a database, and the data requested by using the first packet is a record in the database.

7. The method according to claim 1, wherein the data that is requested by using the third packet and that is stored in the intermediate device is requested by the intermediate device from a storage device; or the data that is requested by using the third packet and that is stored in the intermediate device is obtained by the intermediate device from a packet sent by a storage device to a client.

8. The method according to claim 1, wherein the intermediate device stores the data requested by using the first packet in a cache.

9. The method according to claim 1, wherein an application layer field comprised in the feature of the first packet is a key-value string.

10. An intermediate device comprising one or more processors and one or more memories, wherein the one or more memories store one or more computer programs, the one or more computer programs comprise instructions, and when the instructions are executed by the one or more processors, cause the intermediate device to perform a method for optimizing data access performance, and the method comprises:

parsing, by the intermediate device in a communication network, a received first packet to obtain a feature of the first packet, wherein the intermediate device is a network device between a client and a server side, there are one or more clients, there are one or more server sides, and wherein the first packet is from a terminal on which one of the one or more clients is located, the first packet is used to request data from one of the one or more server sides, the feature indicates the data requested by using the first packet, and the feature is carried in a part that is of the first packet and that corresponds to application layer data;

when the intermediate device stores the data requested by using the first packet, sending, by the intermediate device, the data requested by using the first packet to the terminal;

receiving, by the intermediate device, a third packet, wherein the third packet is used to request data from one of the one or more server sides, and the third packet is from a terminal on which one of the one or more clients is located; and when a quantity of requested times of the data requested by using the third packet is greater than a threshold, storing, by the intermediate device, the data requested by using the third packet in the intermediate device, wherein the threshold is maintained per feature to indicate a number of times data is requested using the feature, and the quantity of requested times is aggregated by the intermediate device irrespective of which terminals send the requests.

11. The device according to claim 10, wherein the feature of the first packet comprises values of a plurality of fields arranged according to a rule, and the rule indicates a corresponding order of the plurality of fields in the feature of the first packet.

12. The device according to claim 11, wherein the plurality of fields comprise a scatter-gather list (SGL) field and a start logical block address (start LBA) field.

13. The device according to claim 10, wherein the intermediate device stores a mapping relationship between the feature of the first packet and a server side identifier, and the method further comprises:

when the intermediate device does not store the data requested by using the first packet, send, in a redirection manner based on the feature of the first packet and the mapping relationship between the feature of the first packet and the server side identifier, a second packet to a server side corresponding to the feature of the first packet, wherein data requested by using the second packet is the same as that requested by using the first packet.

14. The device according to claim 10, wherein the first packet is used to request data from a storage device, and the data requested by using the first packet is block data of the storage device.

15. The device according to claim 10, wherein the first packet is used to request data from a database, and the data requested by using the first packet is a record in the database.

16. The device according to claim 10, wherein the data that is requested by using the third packet and that is stored in the intermediate device is requested by the intermediate device from a storage device; or the data that is requested by using the third packet and that is stored in the intermediate device is obtained by the intermediate device from a packet sent by a storage device to a client.

17. A chip, comprising:

a communication interface configured to: receive a signal, and transmit the signal to a processor; and the processor configured to: process the signal to cause an intermediate device in a communication network to perform a method for optimizing data access performance, the intermediate device is a network device between a client and a server side, there are one or more clients, there are one or more server sides, and the method comprises:

parsing, by the intermediate device, a received first packet to obtain a feature of the first packet, wherein the first packet is from a terminal on which one of the one or more clients is located, the first packet is used to request data from one of the one or more server sides, the feature indicates the data requested by using the first packet, and the feature is carried in a part that is of the first packet and that corresponds to application layer data;

when the intermediate device stores the data requested by using the first packet, sending, by the intermediate device, the data requested by using the first packet to the terminal; and receiving, by the intermediate device, a third packet, wherein the third packet is used to request data from one of the one or more server sides, and the third packet is from a terminal on which one of the one or more clients is located; and when a quantity of requested times of the data requested by using the third packet is greater than a threshold, storing, by the intermediate device, the data requested by using the third packet in the intermediate device, wherein the threshold is maintained per feature to indicate a number of times data is requested using the feature, and the quantity of requested times is aggregated by the intermediate device irrespective of which terminals send the requests.

18. A non-transitory computer-readable storage medium, wherein the computer-readable storage medium stores computer instructions, and when the computer instructions are run on an intermediate device, a method for optimizing data access performance is performed by the intermediate device, comprising:

parsing, by the intermediate device in a communication network, a received first packet to obtain a feature of the first packet, wherein the intermediate device is a network device between a client and a server side, there are one or more clients, there are one or more server sides, and wherein the first packet is from a terminal on which one of the one or more clients is located, the first packet is used to request data from one of the one or more server sides, the feature indicates the data requested by using the first packet, and the feature is carried in a part that is of the first packet and that corresponds to application layer data;

when the intermediate device stores the data requested by using the first packet, sending, by the intermediate device, the data requested by using the first packet to the terminal; and receiving, by the intermediate device, a third packet, wherein the third packet is used to request data from one of the one or more server sides, and the third packet is from a terminal on which one of the one or more clients is located; and when a quantity of requested times of the data requested by using the third packet is greater than a threshold, storing, by the intermediate device, the data requested by using the third packet in the intermediate device, wherein the threshold is maintained per feature to indicate a number of times data is requested using the feature, and the quantity of requested times is aggregated by the intermediate device irrespective of which terminals send the requests.

* * * * *